United States Patent
Mizukami et al.

(10) Patent No.: US 8,064,762 B2
(45) Date of Patent: Nov. 22, 2011

(54) IMAGING APPARATUS AND IMAGING LENS UNIT

(75) Inventors: Akifumi Mizukami, Osaka (JP); Hisamo Sogawa, Hyogo (JP); Norihiko Akamatsu, Osaka (JP); Akio Kimba, Osaka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/761,843

(22) Filed: Apr. 16, 2010

(65) Prior Publication Data

US 2010/0284679 A1    Nov. 11, 2010

(30) Foreign Application Priority Data

May 8, 2009   (JP) .................................. 2009-113586

(51) Int. Cl.
*G03B 7/085* (2006.01)
(52) U.S. Cl. ...................................... 396/257
(58) Field of Classification Search .................. 396/257
See application file for complete search history.

(56) References Cited

U.S. PATENT DOCUMENTS

| | | | |
|---|---|---|---|
| 6,833,864 B1 * | 12/2004 | Ashida | 348/229.1 |
| 2006/0115297 A1 * | 6/2006 | Nakamaru | 399/163 |
| 2008/0259202 A1 * | 10/2008 | Fujii | 348/345 |
| 2008/0303936 A1 * | 12/2008 | Muramatsu et al. | 348/335 |
| 2011/0043677 A1 * | 2/2011 | Muramatsu et al. | 348/333.11 |

FOREIGN PATENT DOCUMENTS

JP    2006-215399    8/2006

* cited by examiner

*Primary Examiner* — Rodney Fuller
(74) *Attorney, Agent, or Firm* — Oblon, Spivak, McClelland, Maier & Neustadt, L.L.P.

(57) ABSTRACT

An imaging apparatus includes: continuous imaging mode setting means for setting a continuous imaging mode in which a plurality of captured images including first and second captured images are continuously acquired; and diaphragm control means for controlling a diaphragm in an imaging optical system, wherein in the continuous imaging mode, the diaphragm control means does not drive the diaphragm during a first period from the time of exposure for the first captured image to the time of exposure for the second captured image but maintains the state of the diaphragm at the time of exposure for the first captured image until the time of exposure for the second captured image.

17 Claims, 18 Drawing Sheets

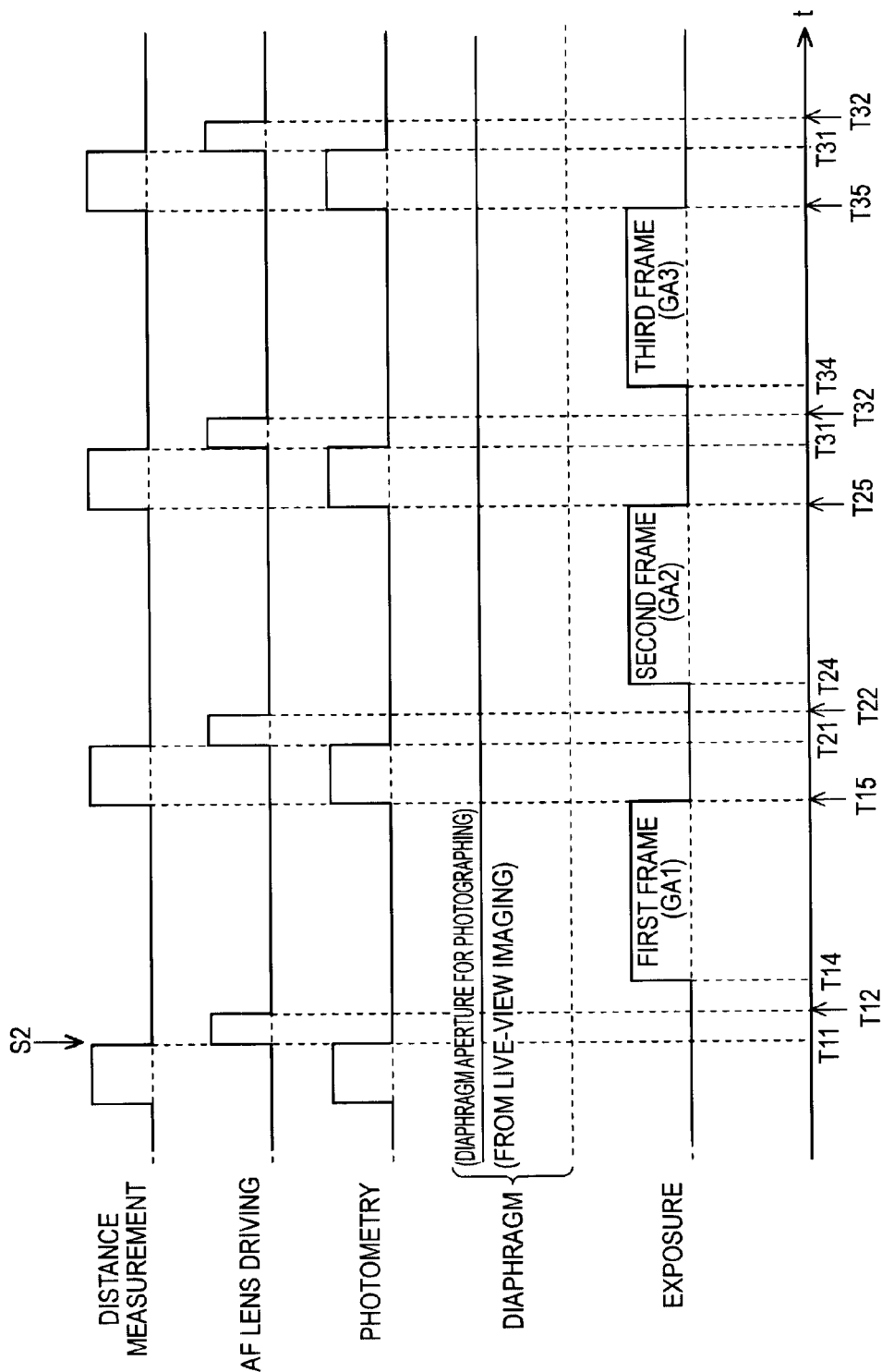

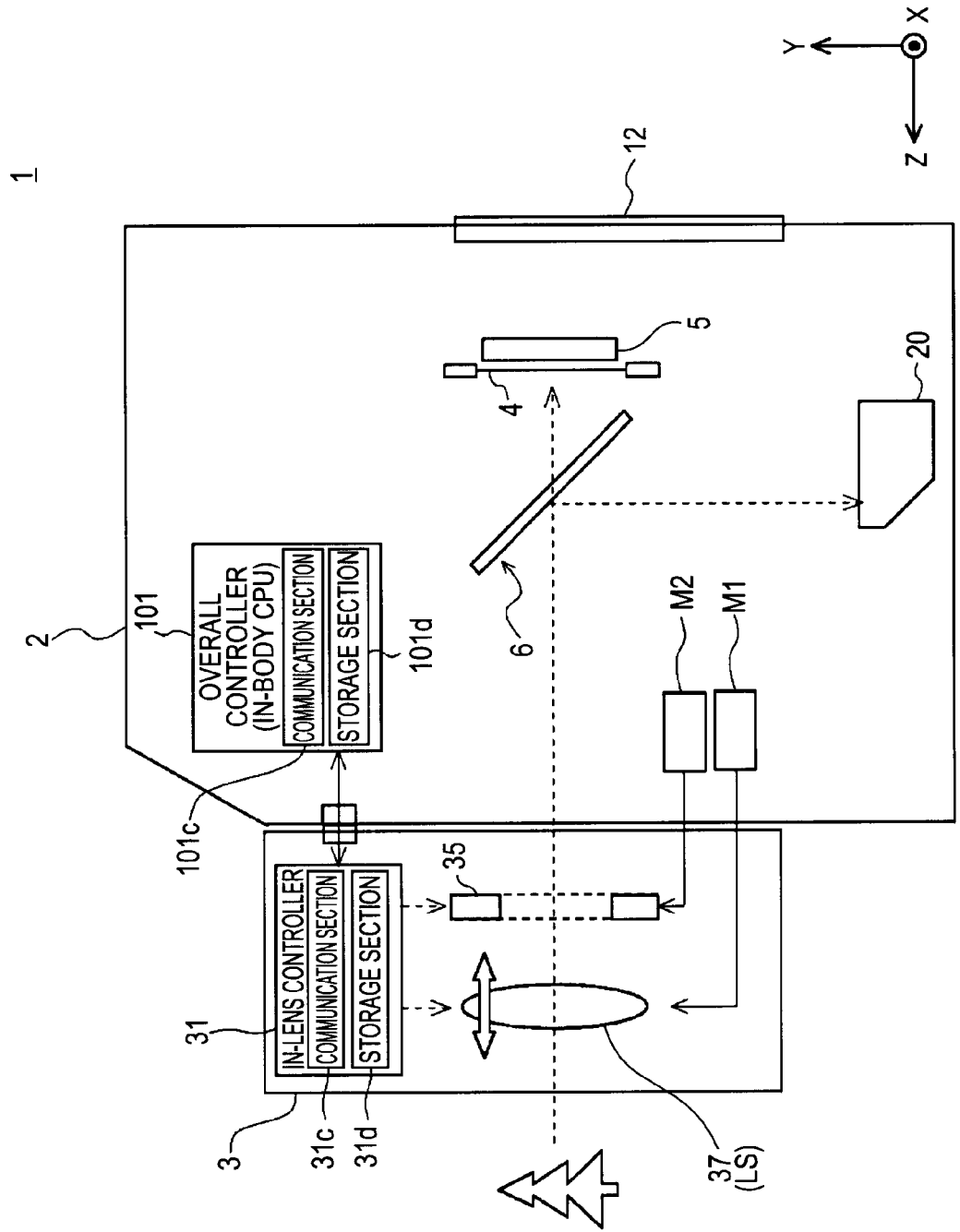

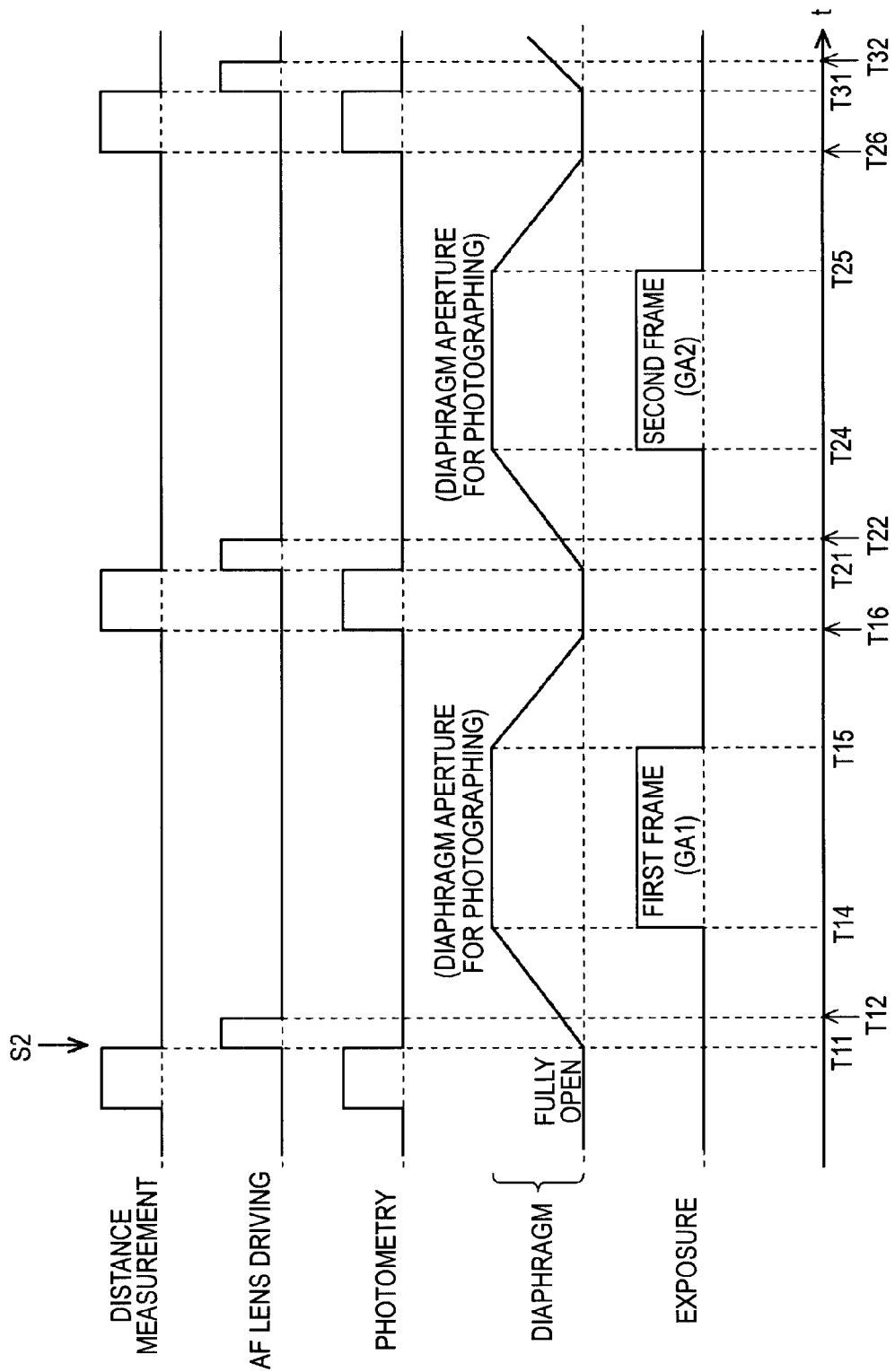

IMAGING APPARATUS AND IMAGING LENS UNIT

BACKGROUND OF THE INVENTION

1. Field of the Invention

The present invention relates to an imaging apparatus, such as a digital camera, and a technology related thereto.

2. Description of the Related Art

In an imaging apparatus, photometry using a photometric sensor and distance measurement using a phase difference-based AF sensor are carried out with, in general, a diaphragm in an imaging lens fully open. An AF lens is then driven based on the result of the distance measurement (measured distance) to carry out automatic focusing (AF). When a release button is fully pressed to issue an imaging instruction, the diaphragm (when described in detail, diaphragm blades) is driven from its fully open state to a state corresponding to a diaphragm aperture for imaging, and automatic exposure (AE) is carried out. The diaphragm aperture for imaging is determined based on the result of the photometry (measured photometric value). A shutter is then fully opened for a predetermined exposure period, and an image of a subject is captured. Thereafter, the diaphragm temporarily returns to its open fully state to carry out the distance measurement and photometry for the next image to be captured. The series of operations described above is repeated to acquire a plurality of captured images successively.

The same operations are carried out in continuous imaging as well. For example, after a first captured image is acquired, the diaphragm (when described in detail, diaphragm blades) temporarily returns from the state for imaging (the state corresponding to a diaphragm aperture for imaging) to the fully open state, and the distance measurement and photometry are carried out for the next captured image acquisition. The diaphragm is then transits again from the fully open state to the imaging state, and a second captured image is acquired. Continuous imaging is carried out by repeating the series of operations described above.

In the procedure described above, the imaging intervals between a plurality of captured images acquired in the continuous imaging are preferably small. That is, the continuous imaging speed is preferably fast.

JP-A-2006-215399, for example, describes a technique for improving the continuous imaging speed.

According to the technique described in JP-A-2006-215399, the period necessary to open or close a diaphragm can be shortened by adjusting the timing at which the diaphragm driving operation is initiated. Specifically, JP-A-2006-215399 describes a technique for reducing a period corresponding to a driving period for an entrance zone in a diaphragm mechanism and an initial current conduction period.

SUMMARY OF THE INVENTION

Using the technique described in JP-A-2006-215399, however, does not always increase the continuous imaging speed to a sufficient value.

Thus, it is desirable to provide an imaging technique that allows the continuous imaging speed to be further improved.

According to one embodiment of the invention, there is provided an imaging apparatus including continuous imaging mode setting means for setting a continuous imaging mode in which a plurality of captured images including first and second captured images are continuously acquired, and diaphragm control means for controlling a diaphragm in an imaging optical system. In the continuous imaging mode, the diaphragm control means does not drive the diaphragm during a first period from the time of exposure for the first captured image to the time of exposure for the second captured image but maintains the state of the diaphragm at the time of exposure for the first captured image until the time of exposure for the second captured image.

According to another embodiment of the invention, there is provided an imaging lens unit including information storage means for storing information on a distance measurement enabling range, which is a range of diaphragm apertures corresponding to the states of a diaphragm in which a light flux used in distance measurement means disposed in an imaging apparatus body to which the imaging lens unit is attached is not blocked, and communication means for transmitting the information stored in the information storage means to the imaging apparatus body.

According to still another embodiment of the invention, there is provided an imaging apparatus including an imaging apparatus body and an imaging lens unit. The imaging apparatus body includes continuous imaging mode setting means for setting a continuous imaging mode in which a plurality of captured images including first and second captured images are continuously acquired, and diaphragm control means for controlling a diaphragm in the imaging lens unit. In the continuous imaging mode, the diaphragm control means does not drive the diaphragm during a first period from the time of exposure for the first captured image to the time of exposure for the second captured image but maintains the state of the diaphragm at the time of exposure for the first captured image until the time of exposure for the second captured image.

According to the one and still another embodiments of the invention, since the diaphragm is not driven in the first period from the time of exposure for the first captured image to the time of exposure for the second captured image but the state of the diaphragm used at the time of exposure for the first captured image is maintained until the time of exposure for the second captured image, the continuous imaging speed can be further improved.

According to the another embodiment of the invention, since the information on the distance measurement enabling range can be transmitted to the imaging apparatus body, the continuous imaging speed can be improved with the diaphragm aperture set at an appropriate value.

BRIEF DESCRIPTION OF THE DRAWINGS

FIG. 16 is a timing chart showing the operation according to the third embodiment;

FIG. 17 shows an internal configuration of an imaging apparatus according to a variation; and FIG. 18 is a timing chart showing the operation according to Comparison Example.

DESCRIPTION OF THE PREFERRED EMBODIMENTS

Modes for implementing the invention (hereinafter also referred to as embodiments) will be described below. The description will be made in the following order.

1. First embodiment (a case where continuous imaging is carried out by using a diaphragm aperture determined in an exposure control operation, provided that the diaphragm aperture falls within a distance measurement enabling range (which will be described later))
2. Second embodiment (a case where continuous imaging may always be carried out by using a predetermined diaphragm aperture)
3. Third embodiment (a case where continuous imaging is carried out by using a diaphragm aperture within a distance measurement enabling range determined in accordance with the result of diaphragm aperture calculation performed in a composition finalizing period and driving the diaphragm in advance in the composition finalizing period)
4. Variations and others

1. First Embodiment

<1-1. Summary of Configuration>

Figure 1:
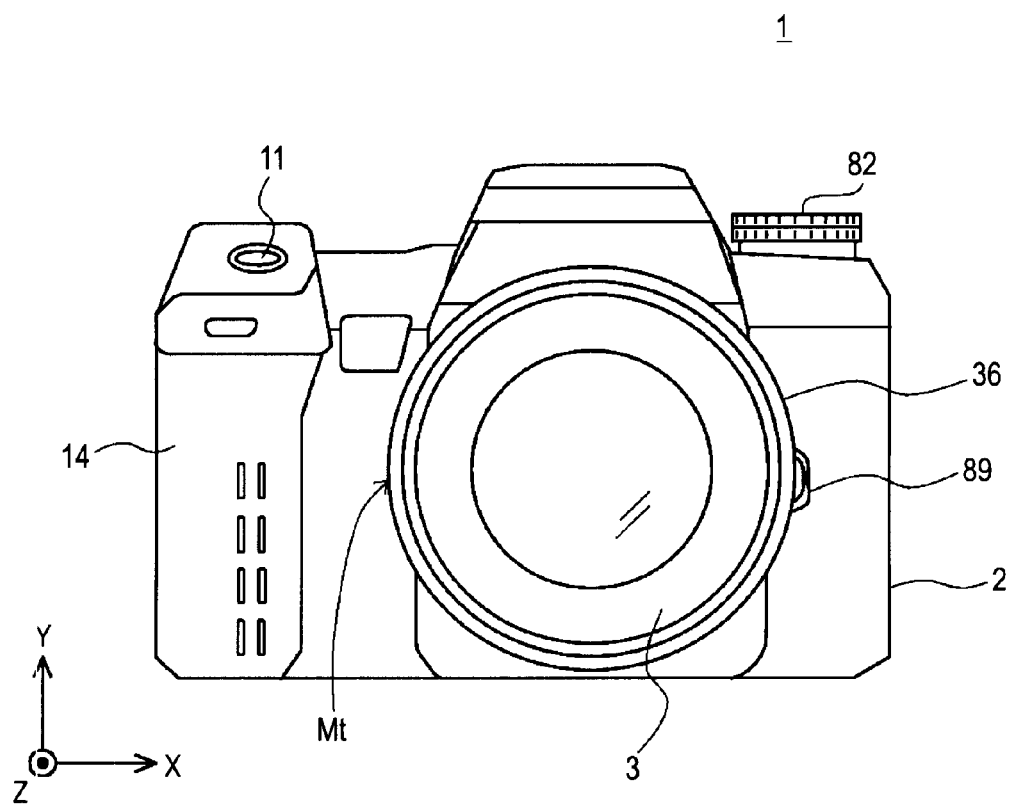
FIG. 1 is a front view of an imaging apparatus.
Figure 2:
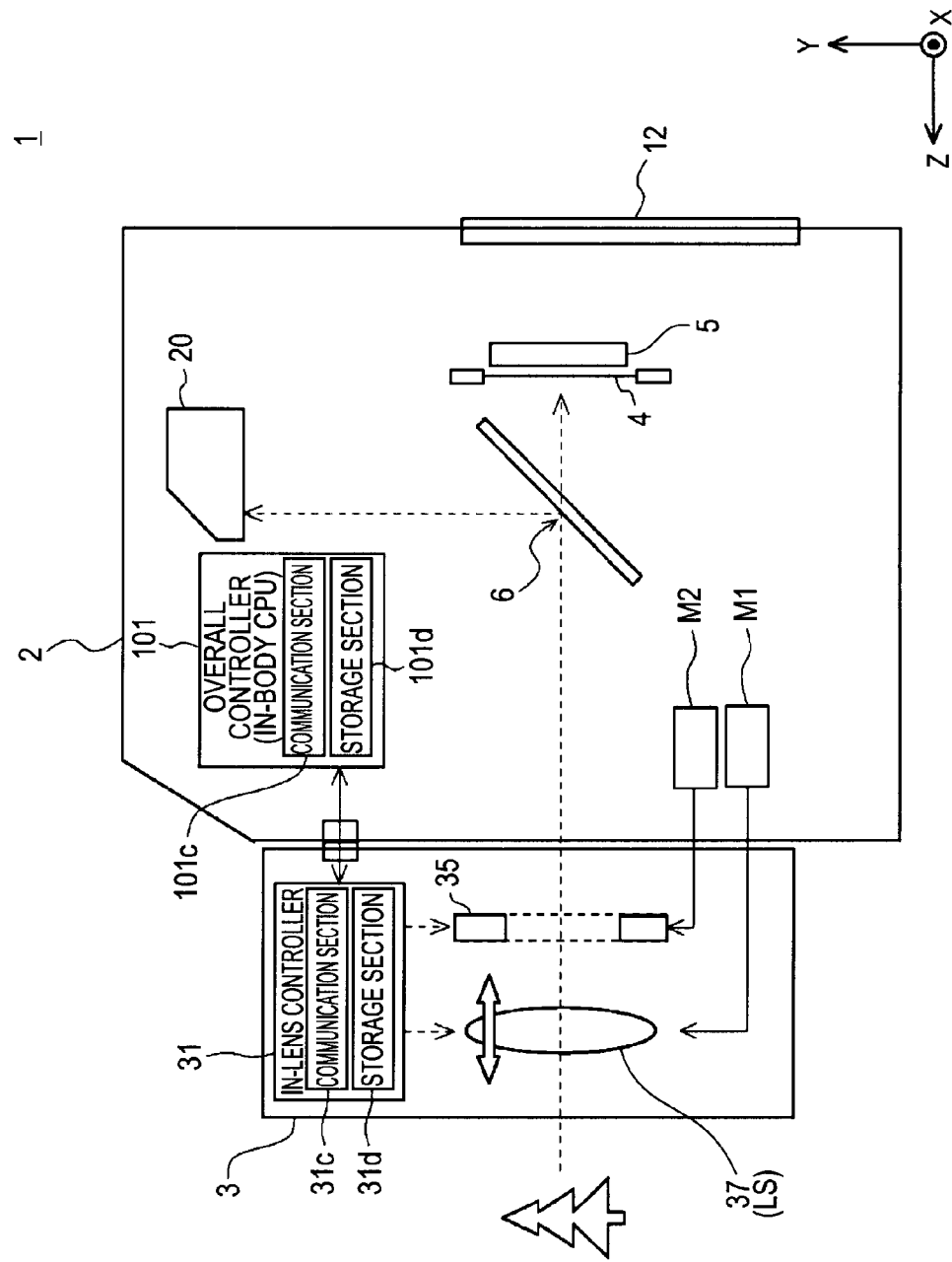
FIG. 2 shows an internal configuration of the imaging apparatus.

FIG. 1 shows an exterior configuration of an imaging apparatus 1 (1A) according to an embodiment of the invention and is a front view of the imaging apparatus 1. FIG. 2 shows an internal configuration of the imaging apparatus 1 and is a schematic side view of the interior of the imaging apparatus 1. The imaging apparatus 1 is configured as an interchangeable lens digital camera. In FIGS. 1 and 2 and other figures, a lens group 37 formed of a plurality of lenses is expressed by a single lens LS to simplify the description.

As shown in FIGS. 1 and 2, the imaging apparatus 1 includes a camera body (imaging apparatus body) 2. An interchangeable imaging lens unit (interchangeable lens) 3 can be attached to and detached from the camera body 2.

The imaging lens unit 3 is primarily formed of a lens barrel 36 (FIG. 1), and the lens group 37 (FIG. 2), a diaphragm 35, and other components provided in the lens barrel 36. The lens group 37 (imaging optical system) includes a focusing lens that is moved in the optical axis direction to change the focus position.

As shown in FIG. 1, the camera body 2 includes an annular lens mount Mt disposed in a substantially central portion of the front side of the camera body 2 and an attachment/detachment button 89 disposed in the vicinity of the annular lens mount Mt. The imaging lens unit 3 is attached to the annular lens mount Mt, and the attachment/detachment button 89 is used to attach and detach the imaging lens unit 3.

The camera body 2 is electrically connected to the imaging lens unit 3 via a predetermined electric contact provided in the vicinity of the lens mount Mt, and hence can acquire various types of information on the imaging lens unit 3 attached to the camera body 2. Specifically, an overall controller 101 (FIG. 3) in the camera body 2 can acquire a full-aperture f number of the imaging lens unit 3 attached to the camera body 2, a distance measurement enabling f number (which will be described later), and other information by communicating with a controller 31 in the imaging lens unit 3 (a CPU or any other suitable component in the lens unit).

The camera body 2 further includes a grip 14 that is disposed at the left end of the front side and gripped by a user. A release button 11 for instructing the camera to start exposure is provided on the upper side of the grip 14. The grip 14 has a battery compartment and a card compartment provided therein. The battery compartment houses a lithium-ion battery or any other suitable battery as a power source of the camera, and the card compartment detachably houses a memory card 90 (see FIG. 3) for recording image data on captured images.

The release button 11 is a two-stage detection button capable of detecting two states, a half-pressed state (S1 state) and a fully-pressed state (S2 state). When the release button 11 is pressed halfway into the S1 state, preparation actions (AF control operation, for example) for acquiring a still image of a subject to be recorded (actually captured image) are carried out. When the release button 11 is further pressed into the S2 state, operations of acquiring the actually captured image are carried out. When described in detail, a series of operations including exposing an imaging device 5 (which will be described later) to an image of the subject (an optical image of the subject) and performing predetermined image processing on an image signal produced by the exposure operation. As described above, when the release button 11 is pressed halfway into the S1 state, the imaging apparatus 1 interprets the S1 state to mean that an imaging preparation instruction is issued (accepted), whereas when the release button 11 is fully pressed into the S2 state, the imaging apparatus 1 interprets the S2 state to mean that an imaging instruction (imaging start instruction) is issued (accepted).

The camera body 2 further includes a mode setting dial 82 in an upper right portion when viewed from the front. Operating the mode setting dial 82, an operator can set sub-modes of "imaging modes" for acquiring an actually captured image. The "imaging modes" include a "single frame imaging mode" in which captured images are acquired one at a time when the release button 11 is pressed into the state S2 and a "continuous imaging mode" in which a plurality of actually captured images are continuously captured (acquired) during a period when the release button 11 is kept pressed into the state S2. When the operator operates the mode setting dial 82, an imaging mode setting section 117 (FIG. 3) sets an imaging mode according to the rotated position of the mode setting dial 82. The imaging apparatus 1 can thus set, for example, the "continuous imaging mode" as the imaging mode.

<1-2. Functional Blocks>

Figure 3:
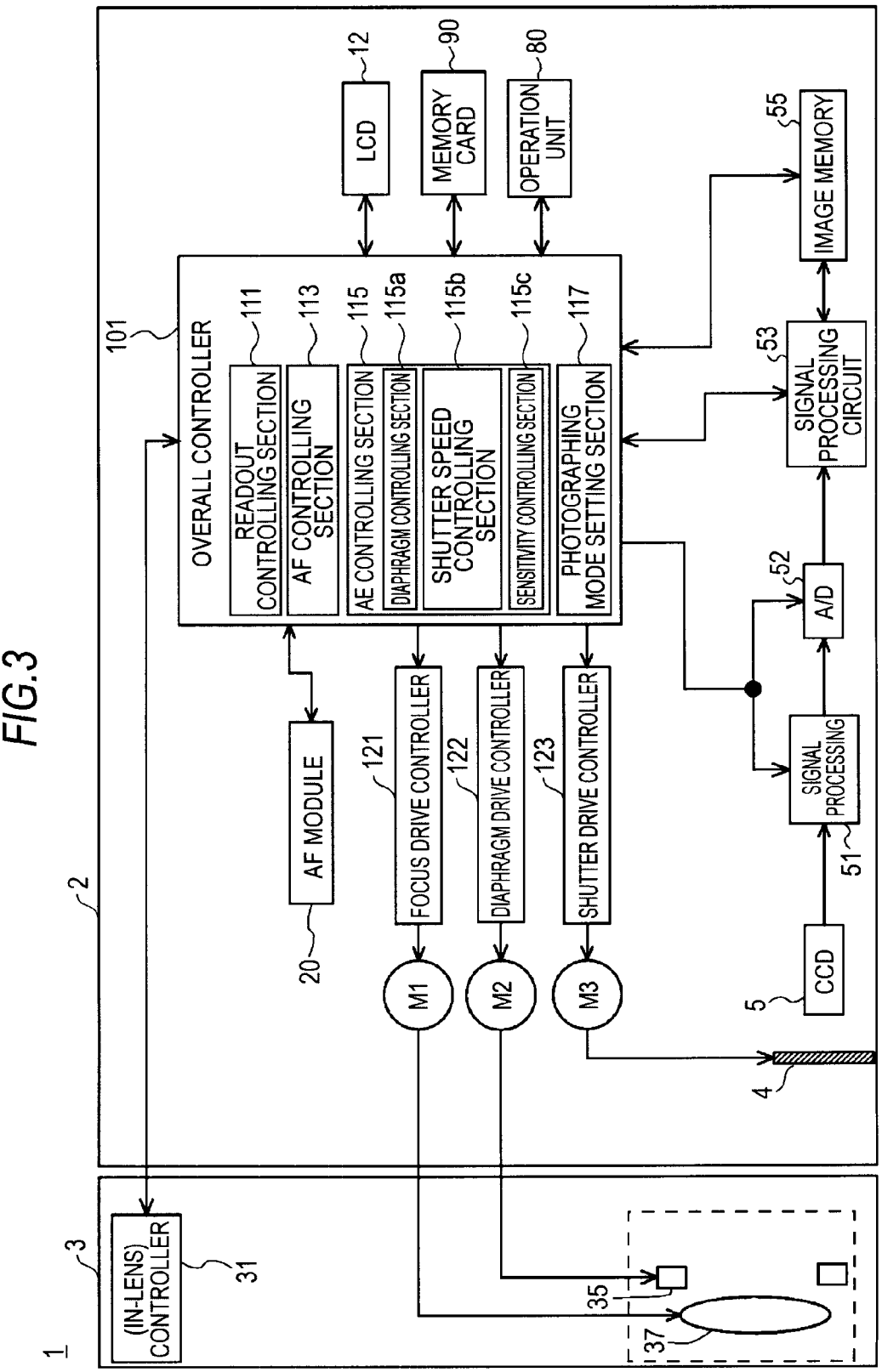
FIG. 3 is a block diagram showing a functional configuration of the imaging apparatus.

A summary of functions of the imaging apparatus 1 will be described with reference to FIG. 3. FIG. 3 is a block diagram showing a functional configuration of the imaging apparatus 1.

As shown in FIG. 3, the imaging apparatus 1 includes an AF sensor module 20, an operation unit 80, the overall controller 101, a focus drive controller 121, a diaphragm drive controller 122, a shutter drive controller 123, and a digital signal processing circuit 53.

The operation unit 80 is formed of a variety of buttons, switches, and other components including the release button 11 (see FIG. 1). The overall controller 101 performs a variety of operations in response to an input operation performed by a user through the operation unit 80.

The AF sensor module (also simply referred to as an AF module) 20 can detect how well a subject is brought into focus by using the light reflected off a semi-transparent mirror 6 (FIG. 2) and impinging on the AF module 20 along with a phase difference-based in-focus state detection method. Specifically, the AF module 20 can detect the position of the focusing lens where the subject is brought into focus (in-focus lens position), plainly speaking, can detect the amount of defocus on the imaging device plane. The AF module 20 is therefore also referred to as an in-focus lens position detector that detects the focusing lens position. The AF module 20 is also referred to as a distance measuring device that detects information on the distance to a subject (a subject distance or an in-focus lens position, for example) or a focus position detector that detects the focus position of the imaging lens.

The overall controller 101 is formed of a microcomputer and primarily includes a CPU, a memory, and a ROM (EEPROM, for example). The overall controller 101 reads a program stored in the ROM and executes the program in the CPU to perform a variety of functions.

When described in detail, the overall controller 101 includes a readout controlling section 111, an AF controlling section (focus controlling section) 113, an AE controlling section (exposure controlling section) 115, and the imaging mode setting section 117.

The readout controlling section 111 controls an operation of reading from the imaging device 5 electric charge as an electric signal produced by the imaging device 5 in a photoelectric conversion process. The thus read electric signal is produced as an image signal.

The AF controlling section (focus controlling section) 113 cooperates with the AF sensor module 20, the focus drive controller 121, and other components to carryout focus control in which the position of the focusing lens is controlled (AF). The AF controlling section 113 uses the focus drive controller 121 to perform AF based on the distance measured by the AF module 20. Specifically, the AF controlling section 113 performs AF based on the in-focus lens position detected by the AF module 20. Using the phase difference-based AF module 20 allows the in-focus lens position to be determined in a significantly quick manner.

The focus drive controller 121 cooperates with the overall controller 101 to perform focus control. Specifically, the focus drive controller 121 produces a control signal based on a signal inputted from the overall controller 101 to drive a motor M1. The focusing lens, which is part of the lens group 37 in the imaging lens unit 3, is thus moved in the optical axis direction of the imaging lens unit 3. The focus drive controller 121 thus controls, for example, the motion of the focusing lens in the optical axis direction.

The AE controlling section (exposure controlling section) 115 cooperates with the diaphragm drive controller 122 and other components to perform exposure control (AE) in which the exposure to a subject image is controlled. The AE controlling section 115 performs the exposure control by setting a variety of exposure parameters (diaphragm aperture, shutter speed, and ISO sensitivity) at appropriate values based on the brightness (measured photometric value) of the subject image acquired by the imaging device 5.

The AE controlling section 115 includes a diaphragm controlling section 115a that controls the diaphragm in the imaging optical system, a shutter speed controlling section 115b that controls the period during which the shutter 4 is fully open (shutter speed) and other parameters, and a sensitivity controlling section 115c that controls an amplification gain and other parameters in a signal processor 51. Adjustment of the amplification gain in the signal processor 51 corresponds to adjustment of the ISO sensitivity.

The diaphragm drive controller 122 cooperates with the overall controller 101 to drive the diaphragm 35 in the imaging lens unit 3. Specifically, the diaphragm drive controller 122 produces a control signal based on a signal inputted from the diaphragm controlling section 115a to control a motor M2 for driving the diaphragm 35. In this way, the diaphragm 35 (when described in detail, diaphragm blades of the diaphragm 35) is driven, and the size of the opening of the diaphragm 35 (in other words, diaphragm aperture) is adjusted.

The shutter drive controller 123 produces a control signal based on a signal inputted from the overall controller 101 to drive a motor M3. The shutter 4 is thus opened and closed.

The imaging device (CCD sensor (also simply referred to as CCD), for example) 5 is a light receiving device that converts an optical image of a subject (subject image) having passed through the imaging lens unit 3 into an electric signal in a photoelectric conversion process. The imaging device 5 produces and acquires an image signal related to an actually captured image (image signal to be recorded).

The imaging device 5 is exposed to the subject image focused on a light receiving surface (accumulates electric charge produced in the photoelectric conversion process) in response to drive control signals (accumulation start signal and accumulation end signal) from the overall controller 101 to produce an image signal (captured image) related to the subject image. The imaging device 5 outputs the image signal to the signal processor 51 further in response to a readout control signal from the overall controller 101.

After the signal processor 51 performs predetermined analog signal processing on the image signal acquired by the imaging device 5, an A/D conversion circuit 52 converts the image signal having undergone the analog signal processing into digital image data (image data). The image data are inputted to the digital signal processing circuit 53. The analog signal processing performed by the signal processor 51 includes signal amplification. Adjusting the amplification gain in the signal amplification allows the adjustment corresponding to the ISO sensitivity adjustment described above to be made.

The digital signal processing circuit 53 performs digital signal processing on the image data inputted from the A/D conversion circuit 52 to produce image data related to the captured image. The digital signal processing circuit 53 includes a black level correction circuit, a white balance (WB) circuit, and a gamma correction circuit, and performs various types of digital image processing. The image signal (image data) processed by the digital signal processing circuit 53 is stored in an image memory 55. The image memory 55 is a high-speed accessible image memory for temporarily storing the produced image data. The image memory 55 has a capacity for storing image data corresponding to a plurality of frames.

At the time of actual imaging, the image data temporarily stored in the image memory 55 undergo image processing (such as compression) as appropriate in the overall controller 101 and are then stored in a memory card 90.

On the other hand, at the time of live viewing, time-series image data acquired by the imaging device 5 and stored in the image memory 55 are sequentially transferred to a VRAM (not shown) as appropriate by the overall controller 101, and images based on the time-series image data are displayed on a backside monitor 12 (FIG. 2). In this way, video-like display (live-view display) for finalizing composition is achieved.

<1-3. Internal Configuration of Imaging Apparatus>

The internal configuration of the imaging apparatus 1 will be described with reference to FIG. 2 again.

The semi-transparent mirror 6 in the imaging apparatus 1 is disposed in the optical path (imaging optical path) of the light flux (subject image) having passed through the imaging lens unit 3. When described in detail, the semi-transparent mirror 6 is disposed in the path along which the subject image (optical image) having passed through the imaging lens unit 3 travels and inclined to the direction in which the optical image travels by a predetermined placement angle (approximately 45 degrees). The semi-transparent mirror 6 is not moved but fixed in a predetermined position in the camera body 2.

The semi-transparent mirror 6 transmits part of the amount of incident light (approximately 70%, for example) and reflects the remainder (approximately 30%, for example). The amount of light passing through the semi-transparent mirror 6 is not limited to 50% but may be any other value.

The reflected light component reflected off the semi-transparent mirror 6, which is part (approximately 30%, for example) of the optical image (subject image) having passed through the imaging lens unit 3, is guided to the AF module 20 disposed in an upper portion of the camera body 2 and used in the phase difference-based AF operation. The light flux guided to the AF module 20 is also referred to as a light flux for distance measurement because it is the light flux used in the AF operation (when described in detail, distance measurement).

On the other hand, the transmitted light component having passed through the semi-transparent mirror 6, which is part (approximately 70%, for example) of the light having traveled through the imaging lens unit 3, travels toward the shutter 4 and the imaging device 5. The optical image (subject image) having reached the imaging device 5 is acquired as a captured image (an actually captured image or a live-view image). The transmitted light component passing through the semi-transparent mirror 6 is also referred to as a light flux for imaging because it is the light flux used in an imaging operation. The shutter 4 and the imaging device 5 are disposed in this order downstream of the semi-transparent mirror 6 in the apparatus (on the downstream side in the direction in which the light travels).

When described in more detail, in the single frame imaging mode, for example, the shutter 4 may always be fully open until the release button 11 is fully pressed into the state S2 (that is, during the composition finalizing period), and the light passing through the semi-transparent mirror 6 reaches the imaging device 5. The imaging device 5 produces an image signal of the subject in the photoelectric conversion process based on the received light flux. During the composition finalizing period, the imaging device 5 acquires a plurality of images as "live-view images," which are continuously acquired at very short intervals (1/60 seconds, for example). The live-view images are displayed on the backside monitor 12 in real time and used to finalize composition.

Thereafter, when the release button 11 is fully pressed into the state S2, an actual imaging operation (exposure for a still image to be recorded) is carried out. Specifically, the shutter 4 is fully opened for the period corresponding to a shutter speed having been set (1/250 seconds, for example), and the light having passed through the semi-transparent mirror 6 reaches the imaging device 5 and stays there for the period during which the shutter 4 is fully opened. The imaging device 5 produces an image signal of the subject in the photoelectric conversion process based on the received light flux. As described above, an actually captured image (still image data to be recorded) of the subject is produced by guiding the light flux from the subject (subject image) through the imaging lens unit 3 to the imaging device 5.

<1-4. Distance Measurement Enabling Range of Diaphragm Apertures>

Figure 4:
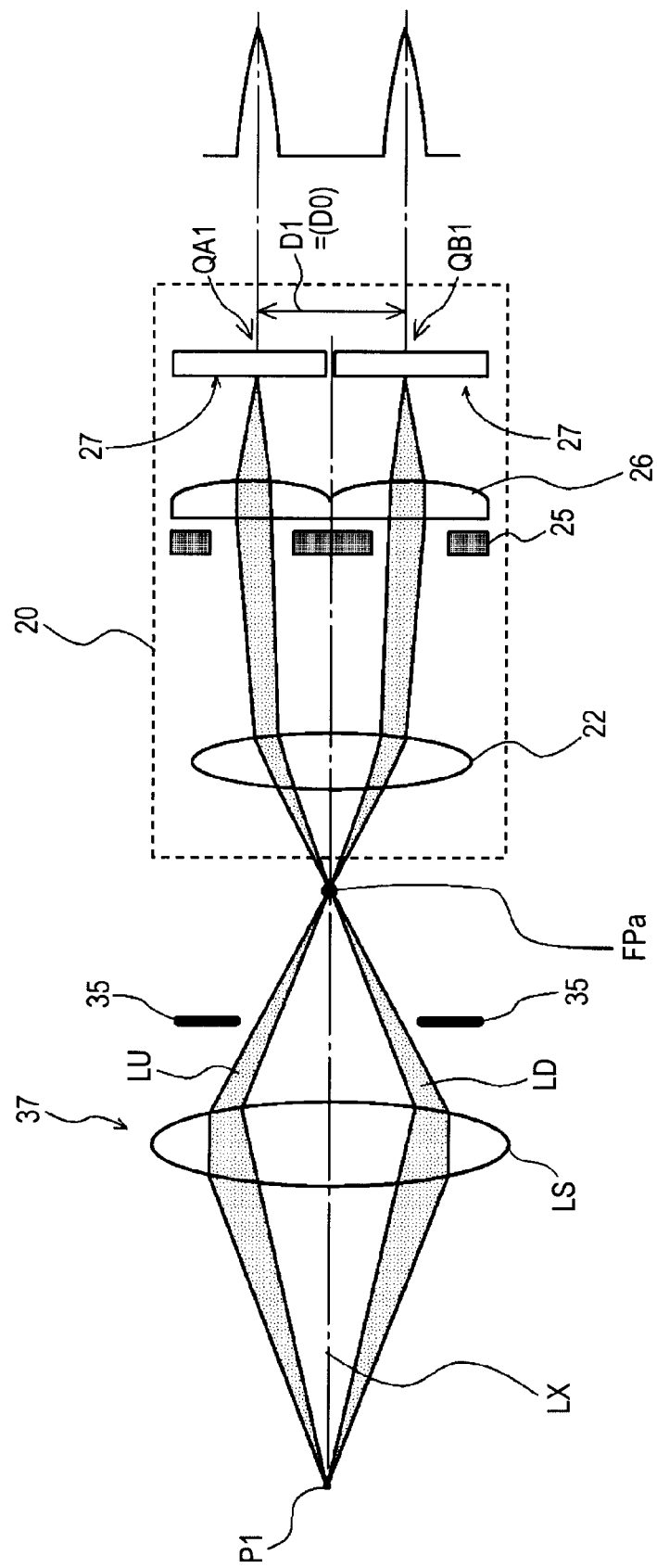
FIG. 4 is a descriptive diagram describing a "distance measurement enabling range" of diaphragm apertures.
Figure 5:
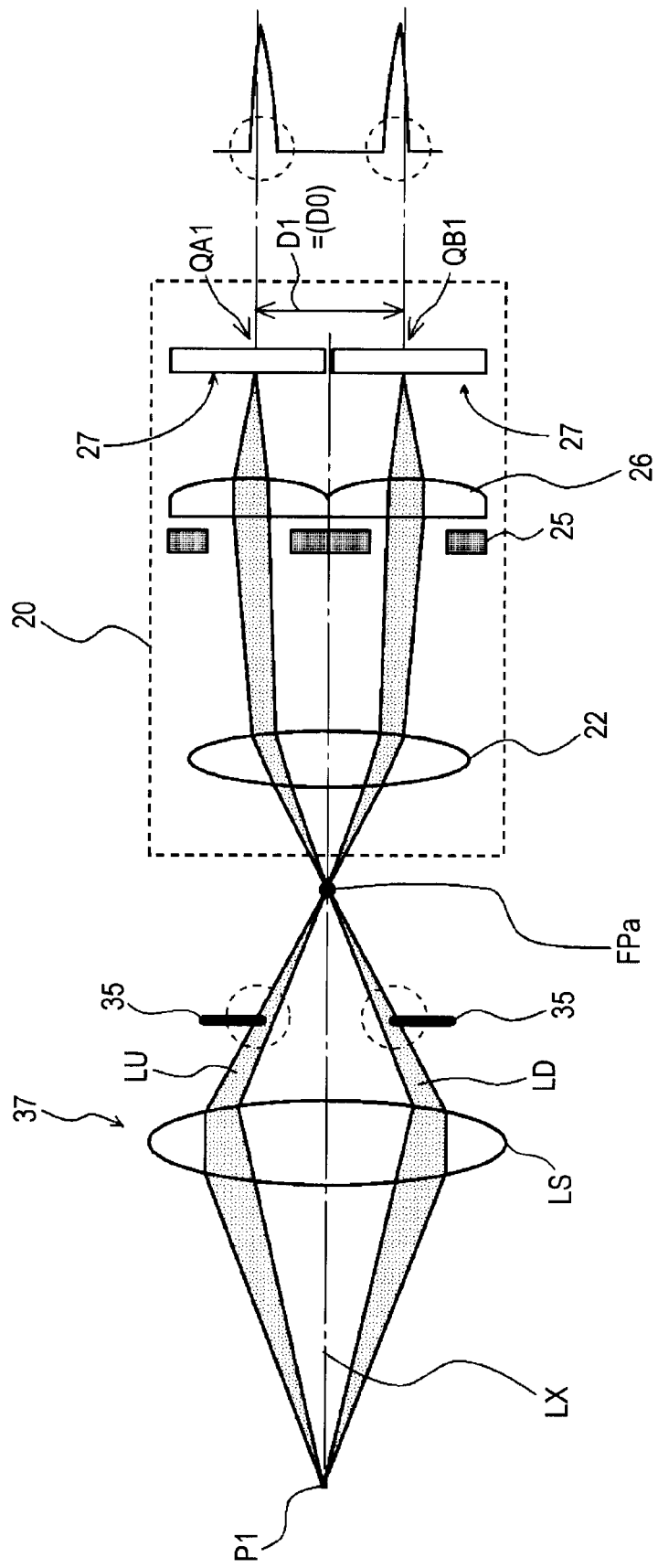
FIG. 5 is another descriptive diagram describing the "distance measurement enabling range" of diaphragm apertures.

FIGS. 4 and 5 are descriptive diagrams describing a "distance measurement enabling range" (which will be described later) of diaphragm apertures. FIG. 4 is a descriptive diagram describing the principle of distance measurement based on a phase difference method. In the following section, descriptions will be made of the principle of distance measurement based on a phase difference method and the "distance measurement enabling range" of diaphragm apertures with reference to FIGS. 4 and 5.

As shown in FIG. 4, the AF module 20 includes AF sensors (also referred to as distance measuring sensors) 27, a condenser lens 22, a diaphragm mask 25, and a separator lens 26. As the AF sensors 27, for example, a pair of light receiving device arrays (such as CCD line sensors) extending in a predetermined direction (X or Y direction) is provided.

When the imaging lens LS is present in the in-focus position (also referred to as in-focus lens position), the light from a point P1 on a subject passes through the imaging lens LS and is then focused again at a point FPa, as shown in FIG. 4. Described in detail, the light rays from the point P1 pass through various portions of the imaging lens LS and are then collected again at the point FPa. For example, in FIG. 4, a light flux LD passing through a lower portion of the imaging lens LS below the optical axis LX and a light flux LU passing through an upper portion of the imaging lens LS above the optical axis LX reach the point FPa. The light flux LD further passes through the condenser lens 22, the diaphragm mask 25, and the separator lens 26 and are collected into a position QA1 on one of the AF sensors 27. The light flux LU further passes through the condenser lens 22, the diaphragm mask 25, and the separator lens 26 and are collected into a position QB1 on the other one of the AF sensors 27. The light fluxes LD and LU having passed through the separator lens 26 and other components are thus collected into the separate positions QA1 and QB1 different from each other. The distance D1 between the positions QA1 and QB1 coincides with a predetermined distance (adequate value) D0.

On the other hand, when the imaging lens LS is present in a front-focus position, the light from a point P1 passes through the imaging lens LS and is then focused into a position in front of the point FPa (on the subject side). In this condition, the light flux LD passing through a lower portion of the imaging lens LS below the optical axis LX further passes through the condenser lens 22, the diaphragm mask 25, and the separator lens 26 and is collected into a position QA2 (not shown) shifted from the position QA1 toward the center (on the lower side in FIG. 4). The light flux LU passing through an upper portion of the imaging lens LS above the optical axis further passes through the condenser lens 22, the diaphragm mask 25, and the separator lens 26 and is collected into a position QB2 (not shown) shifted from the position QB1 toward the center (on the upper side in FIG. 4). The distance D2 between the positions QA2 and QB2 is smaller than the predetermined distance D0.

When the imaging lens LS is present in a rear-focus position, the light from a point P1 passes through the imaging lens LS and is then focused into a position behind the point FPa. In this condition, the light flux LD passing through a lower portion of the imaging lens LS below the optical axis LX further passes through the condenser lens 22, the diaphragm mask 25, and the separator lens 26 and is collected into a position QA3 (not shown) shifted from the position QA1 away from the center (on the upper side in FIG. 4). The light flux LU passing through an upper portion of the imaging lens LS above the optical axis LX further passes through the condenser lens 22, the diaphragm mask 25, and the separator lens 26 and is collected into a position QB3 (not shown) shifted from the position QB1 away from the center (on the lower side in FIG. 4). The distance D3 between the positions QA3 and QB3 is larger than the predetermined distance D0.

As described above, when the imaging lens LS is not present in the in-focus position, the distance D between the positions on the AF sensors 27 where the light fluxes LD and LU are collected deviates from the predetermined distance D0 (increases or decreases) and hence differs from the distance D0. In a phase difference-based AF operation, the amount of shift of the imaging lens LS from the in-focus lens position (and hence the in-focus lens position itself) is determined based on the amount of change in the inter-light flux distance D. The in-focus lens position is a lens position where a subject is brought into focus. Since the in-focus lens position corresponds to the distance to the subject (subject distance) in a one-to-one relationship, determining the in-focus lens position is equivalent to determining the subject distance. In other words, "information on in-focus lens position (in-focus lens position information)" is equivalent to "information on the distance to a subject." Therefore, acquiring in-focus lens position information is one way to "detect information on the distance to a subject." As described above, in a phase difference-based AF operation, distance measurement is carried out by detecting the shift between two images (divided images) in the direction in which the pair of AF sensors 27 are arranged (spaced apart).

In view of the fact described above, the phase difference-based AF operation is typically carried out with the diaphragm fully open so that no vignetting, which will be described below, occurs.

Light fluxes from a subject that are used in the phase difference-based AF operation are those passing through relatively central portions of the imaging lens. When the diaphragm is fully open, light fluxes that are not blocked by the diaphragm 35 but pass therethrough (when described in detail, the opening of the diaphragm) reach the AF sensors 27, as shown in FIG. 4. When described in detail, the light fluxes reach the areas that center around the respective positions QA1 and QB1, as shown in the rightmost portion of FIG. 4.

Now, assume a case where the opening of the diaphragm 35 in the imaging lens unit 3 is reduced in size to a diaphragm aperture (F8.0, for example) larger than a predetermined value V0 (F4.0, for example), as shown in FIG. 5. In this case, the diaphragm 35 (when described in detail, diaphragm blades) disadvantageously blocks at least part of the light fluxes LD and LU. That is, the diaphragm 35 causes a "vignetting" phenomenon. The diaphragm 35 thus blocks the part of the light fluxes, which do not reach the vicinity of the positions QA1 and QB1 and hence the images of the collected light fluxes LD and LU are truncated, as shown in the rightmost portion of FIG. 5. As a result, the distance measurement is not carried out accurately.

As described above, the phase difference-based AF operation is typically carried out with the diaphragm fully open (see FIG. 4) so that the vignetting described above will not occur.

On the other hand, when the diaphragm aperture is set at a value (F2.8, for example) smaller than or equal to the predetermined value V0 (F4.0, for example), the distance measurement is carried out accurately as well because the phenomenon described above will not occur. Among a plurality of diaphragm apertures, those smaller than or equal to the predetermined value V0 are herein referred to as diaphragm apertures that allow the AF module 20 to carry out distance measurement (or simply referred to as "distance measurement enabling diaphragm apertures"). The "distance measurement enabling diaphragm apertures" are also expressed as diaphragm apertures corresponding to diaphragm states in which the light fluxes used by the AF module 20 are not blocked. Further, among a plurality of diaphragm apertures, a diaphragm aperture range that allows the AF module 20 to carry out distance measurement is referred to as a "distance measurement enabling range." The distance measurement enabling diaphragm apertures are also referred to as AF enabling diaphragm apertures, and the distance measurement enabling range is also referred to as an AF enabling range.

In the present embodiment, the distance measurement using the AF module 20 is carried out in the continuous imaging mode by using a diaphragm aperture within a distance measurement enabling range, as will be described later. More specifically, a plurality of actually captured images is acquired in the continuous imaging mode with the diaphragm aperture kept set at a value within a "distance measurement enabling range" (without driving the diaphragm blades). In this way, not only can the distance measurement be carried out accurately, but also the continuous imaging speed can be improved.

The state of the "vignetting" described above changes, for example, with the position of the diaphragm 35 in the imaging lens unit 3 in the optical axis direction. The "distance measurement enabling range" described above therefore changes when the type of the imaging lens unit 3 and other factors change.

In view of the fact described above, the present embodiment will be illustrated with reference to a case where at least one of the imaging lens unit 3 and the camera body 2 holds information on the "distance measurement enabling range" described above. In this way, a variety of imaging lens units 3 can be used appropriately.

Specifically, the camera body 2 stores information on the "distance measurement enabling range," for example, for imaging lens units 3 having been already marketed at the point when the camera body 2 is marketed. On the other hand, imaging lens units 3 that will be newly marketed after the point when the camera body 2 is marketed store information on the "distance measurement enabling range" for the newly marketed imaging lens units 3 therein (storage section 31d (see FIG. 2)). The overall controller 101 in the camera body 2 communicates with the controller 31 in any of the imaging lens units 3 via the electric contact or any other suitable component in the vicinity of the lens mount Mt to acquire information on the "distance measurement enabling range" as necessary. The controller 31 in each imaging lens unit 3 includes a communication section 31c (see FIG. 2) that communicates with the overall controller 101 in the camera body 2, and the overall controller 101 in the camera body 2 includes a communication section 101c that communicates with the controller 31 in the imaging lens unit 3.

Figure 6:
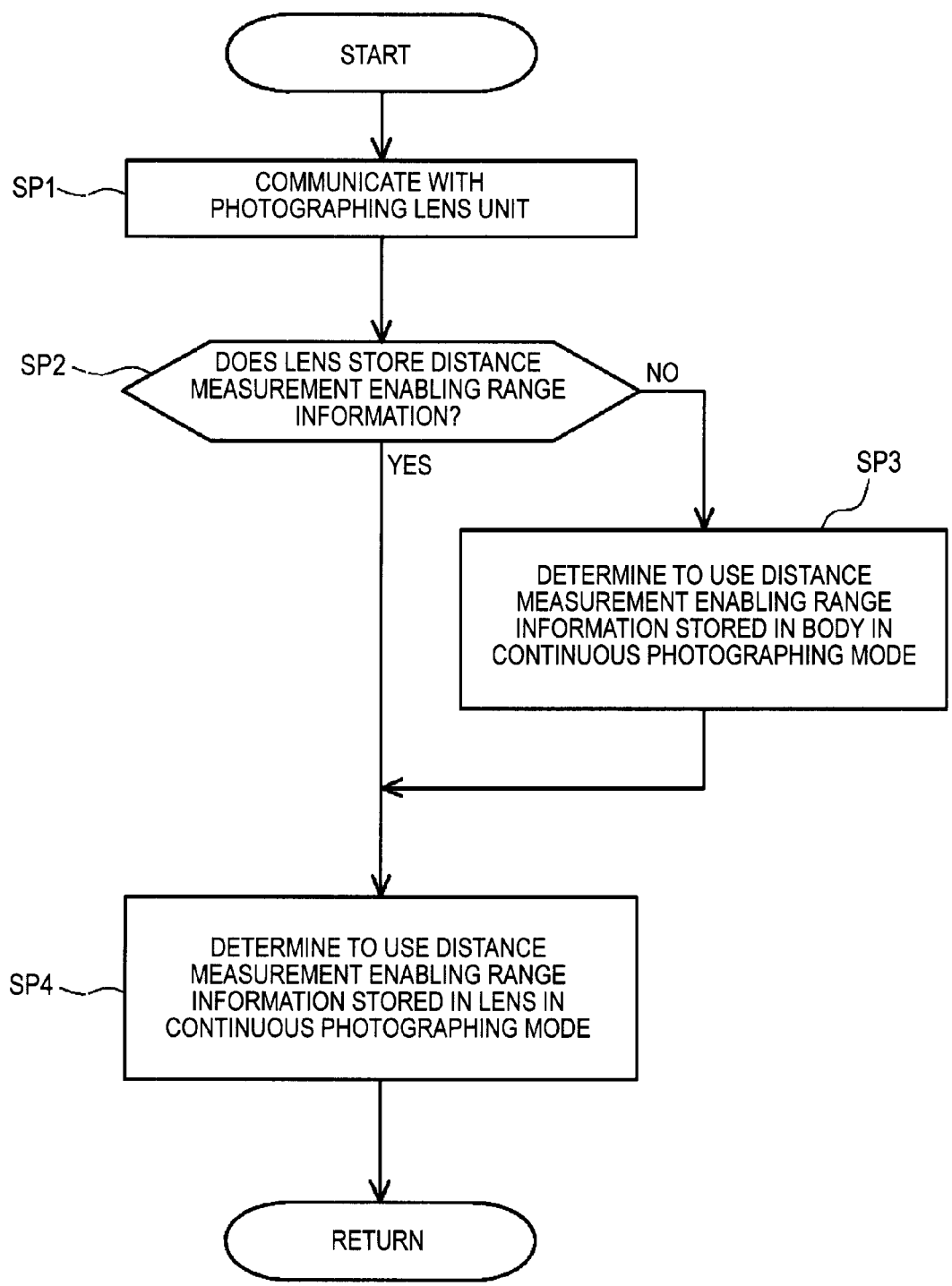
FIG. 6 is a flowchart showing how to determine the "distance measurement enabling range"

FIG. 6 is a flowchart showing how the overall controller 101 determines a "distance measurement enabling range." The following description will be made with reference to a case where information on a "distance measurement enabling range" stored in the imaging lens unit 3 is preferentially used.

As shown in FIG. 6, the overall controller 101 in the camera body 2 first communicates with the controller 31 in the imaging lens unit 3 in the step SP1 to judge whether or not information on a "distance measurement enabling range" is stored in the imaging lens unit 3.

When the imaging lens unit 3 has no information on a "distance measurement enabling range," the control proceeds to the step SP3. In the step SP3, the overall controller 101 reads the "distance measurement enabling range" stored in a storage section 101d (EEPROM, for example) in the camera body 2 (see FIG. 2) and determines to use the "measurement enabling range" in the continuous imaging mode as the diaphragm aperture range.

On the other hand, when the imaging lens unit 3 has information on a "distance measurement enabling range," the control proceeds to the step SP4. In the step SP4, the overall controller 101 communicates with the imaging lens unit 3 to read the "distance measurement enabling range" stored in the storage section 31d (EEPROM, for example) in the imaging lens unit 3, and determines to use the thus read "distance measurement enabling range" in the continuous imaging mode as the diaphragm aperture range. In other words, the information ("distance measurement enabling range") stored in the imaging lens unit 3 is transferred to the overall controller 101, and the transferred "distance measurement enabling range" is determined to be used in the continuous imaging mode as the diaphragm aperture range.

As described above, the overall controller 101 acquires information on a "distance measurement enabling range" and determines to use the acquired "distance measurement enabling range" in the continuous imaging mode as the diaphragm aperture range. The operations described above (FIG. 6) are carried out, for example, immediately after the apparatus is powered on.

<1-5. Operation in Continuous Imaging Mode>

Figure 7:
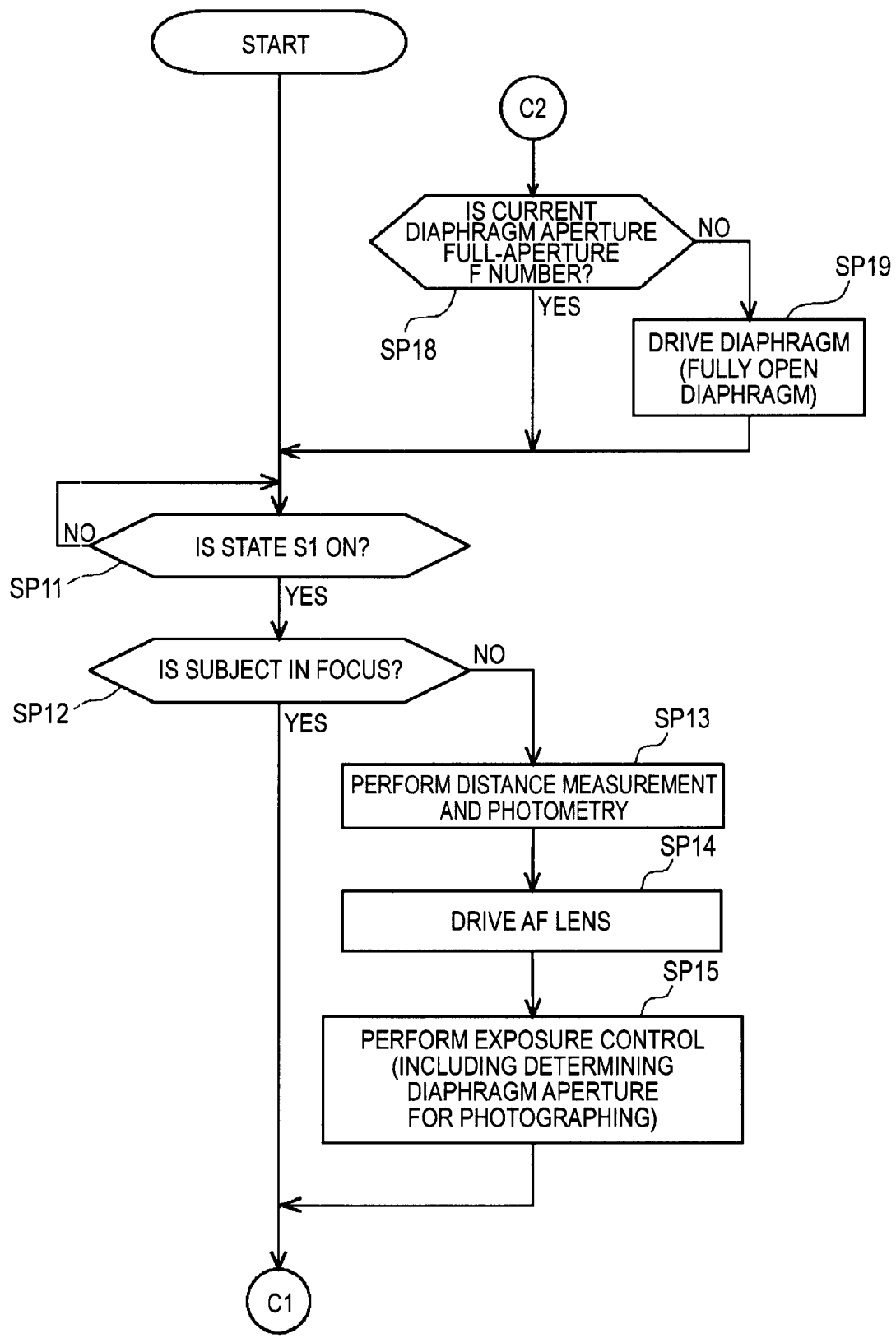
FIG. 7 is a flowchart showing the operation in a continuous imaging mode.
Figure 8:
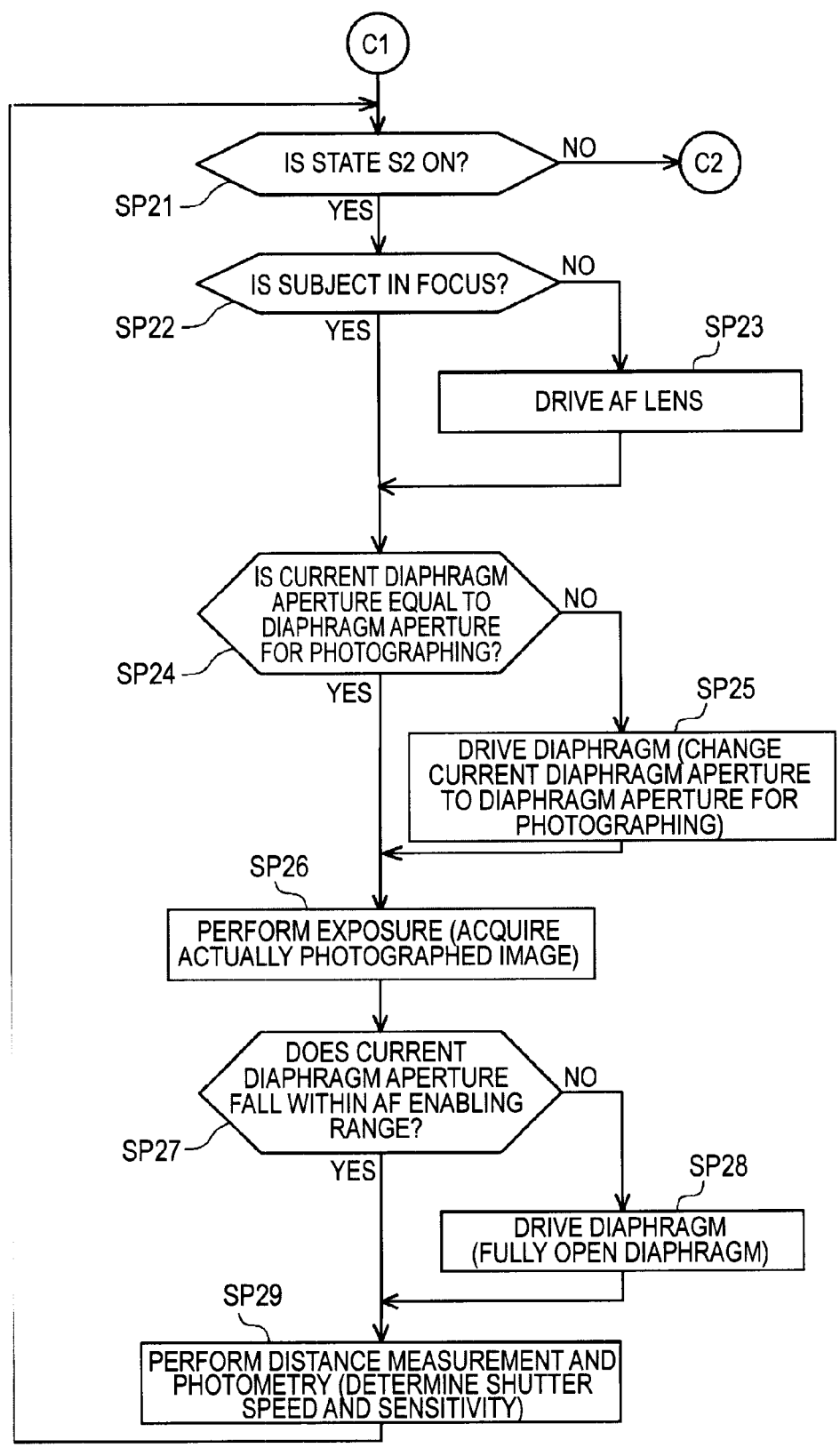
FIG. 8 is another flowchart showing the operation in the continuous imaging mode.

FIGS. 7 and 8 are flowcharts showing the operation in the continuous imaging mode. In the following section, the operation of the imaging apparatus 1 in the continuous imaging mode will be described in detail with reference to FIGS. 7 and 8. It is assumed in the description that the operator has operated the mode setting dial 82 in advance and set the imaging mode of the imaging apparatus 1 to be the "continuous imaging mode." It is further assumed that the information on the "distance measurement enabling range" described above has been acquired (FIG. 6) immediately after the apparatus was powered on.

In an imaging standby state (composition finalizing state), live-view images are displayed on the backside monitor 12. The user finalizes the composition of an actually captured image while viewing the live-view images frequently updated and displayed at very short intervals. In the first embodiment, the distance measurement and the photometry (step SP13) during the composition finalizing period (live-view period) are carried out with the diaphragm 35 fully open.

In the composition finalizing state, it is first judged whether or not the release button 11 has been pressed. Specifically, it is judged in the step SP11 (FIG. 7) whether or not the release button 11 has been pressed halfway into the state S1. The control returns to the step SP11 and waits until the judgment result shows that the release button 11 has been pressed halfway into the state S1. When the judgment result shows that the release button 11 has been pressed halfway into the state S1, the control proceeds from the step SP11 to the step SP12.

In the step SP12, it is judged whether or not a subject is in focus.

When the judgment result shows that the subject is in focus, the control directly proceeds to the step SP21.

On the other hand, when the judgment result shows that the subject is not in focus, the control proceeds to the step SP13.

In the step SP13, the distance measurement and the photometry are carried out. The focusing lens is then driven (step SP14) based on the result of the distance measurement (measured distance), and exposure parameters are determined (step SP15) based on the result of the photometry (measured photometric value). Thereafter, the control proceeds to the step SP21.

In the step SP15, the exposure parameters for live-view images and the exposure parameters for an actually captured image are determined. It is, for example, assumed that the exposure parameters for an actually captured image include three types of exposure parameter, the diaphragm aperture, the shutter speed, and the ISO sensitivity, and that the three types of exposure parameter are determined based on an AE program diagram. The exposure parameters for live-view images are also determined in the same manner.

In the step SP15, a value within the distance measurement enabling range described above (F1.4, F2.8, or F4.0, for example) is selected in some cases as the diaphragm aperture, which is one of the exposure parameters for an actually captured image, (also referred to as a "diaphragm aperture for imaging"). Alternatively, a value that does not fall within the distance measurement enabling range (F8.0, for example) is selected in some cases as the diaphragm aperture for imaging. Another possible value within the distance measurement enabling range is a full-aperture f number (F1.4, for example).

In the first embodiment, when the diaphragm aperture for imaging determined in the step SP15 as the diaphragm aperture used at the time of exposure for a first captured image GA1 falls within the distance measurement enabling range, the imaging apparatus 1 performs the following control: Specifically, the imaging apparatus 1 maintains the diaphragm aperture used at the time of exposure for the captured image GA1 (does not drive the diaphragm 35) in the continuous imaging mode and acquires a second and the remaining captured images. In other words, the imaging apparatus 1 does not drive the diaphragm during the continuous imaging period but uses the diaphragm aperture used at the time of exposure for the first captured image as the diaphragm apertures for the remaining captured images. As will be described later, the continuous imaging speed is improved this way.

On the other hand, when the diaphragm aperture for imaging described above does not fall within the distance measurement enabling range, the imaging apparatus 1 performs the following control in the continuous imaging mode: Specifically, the imaging apparatus 1 acquires a plurality of captured images by repeating for each imaging operation the distance measurement and other operations with the diaphragm temporarily fully open (step SP28) and reduction of the opening of the diaphragm 35 again to the diaphragm aperture for imaging (step SP25). In this case, the continuous imaging speed is not improved, but more appropriate exposure can be carried out by placing a high priority on the diaphragm-related calculation result (diaphragm aperture for imaging).

In the step SP21, it is judged whether or not the release button 11 has been fully pressed into the state S2.

When the judgment result in the step SP21 shows that the release button 11 has not been fully pressed into the state S2, the control proceeds to the step SP18 (FIG. 7). The diaphragm aperture is maintained at the full-aperture f number or returned to the full-aperture f number as necessary (steps SP18 and SP19). The control then returns to the step SP11 again, and the operations described above are repeated. In this way, the AF and AE operations during the composition finalization are carried out with the diaphragm fully open.

On the other hand, when the judgment result in the step SP21 shows that the release button 11 has been fully pressed into the state S2, the control proceeds from the step SP21 to the step SP22.

In the step SP22, it is judged whether or not the subject is in focus. When the focusing lens is not present in the in-focus lens position (that is, when the subject has not been brought into focus), the control proceeds to the step SP23, where the focusing lens is driven to the in-focus lens position. For example, when the focusing lens has not yet been moved to the in-focus lens position, the focusing lens driving operation continues. The control then proceeds to the step SP24.

On the other hand, when the focusing lens is in the in-focus lens position (that is, when the subject is in focus), the control proceeds from the step SP22 directly to the step SP24 (without undergoing the step SP23).

In the step SP24, it is judged whether or not the "current diaphragm aperture" (the f number corresponding to the current state of the diaphragm 35) is equal to the "diaphragm aperture for imaging" (also referred to as the diaphragm aperture for actual imaging). In this description, the value determined in the step SP15 immediately before the release button 11 is fully pressed into the state S2 is used as the "diaphragm aperture for imaging."

When the judgment result shows that the current diaphragm aperture differs from the diaphragm aperture for imaging, the control proceeds to the step SP25, where the diaphragm 35 (when described in detail, the diaphragm blades of the diaphragm 35) is driven so that the diaphragm aperture of the diaphragm 35 is changed to the diaphragm aperture for imaging. Specifically, when the current diaphragm aperture (full-aperture f number, for example) differs from the diaphragm aperture for imaging (F8.0, for example) determined in the step SP15, the diaphragm 35 is driven to the state corresponding to the diaphragm aperture for imaging.

On the other hand, when the judgment result in the step SP24 shows that the current diaphragm aperture is equal to the diaphragm aperture for imaging, the control proceeds from the step SP24 directly to the step SP26 (without undergoing the step SP25). For example, when the current diaphragm aperture (F2.8, for example) is equal to the diaphragm aperture for imaging (F2.8, for example) determined in the step SP15, the diaphragm 35 is not driven.

It is assumed in this description that the AF lens driving operation in the step SP23 and the diaphragm driving operation in the step SP25 can be concurrently carried out.

In the step SP26, after the completion of the AF lens driving operation (step SP23) and the diaphragm driving operation (step SP25) are confirmed, the exposure for an actually captured image is carried out. Specifically, an actually captured image is produced by fully opening the shutter 4 (when described in detail, the opening thereof) for the exposure period according to the shutter speed and using an optical image having passed through the imaging lens unit 3 and the semi-transparent mirror 6 and reached the imaging device 5 during the exposure period. After the exposure period (1/250 second, for example) has elapsed, the shutter 4 immediately returns to a state in which the opening thereof is closed (closed state).

As the exposure parameters for the actually captured image (specifically, the shutter speed and the ISO sensitivity), the values determined in the exposure parameter determining process are used. Specifically, the exposure parameters (diaphragm aperture, shutter speed, and ISO sensitivity) determined in the step SP15 immediately before the release button 11 is fully pressed into the state S2 are used for the first captured image in the continuous imaging. On the other hand, the three types of exposure parameter described above for a second and the following captured images in the continuous imaging are determined as follows: That is, among the three types of exposure parameter, the shutter speed and the ISO sensitivity are updated and determined in the step SP29, which will be described later. Among the three types of exposure parameter, the diaphragm aperture is maintained at the value determined in the step SP15.

After the exposure in the step SP26 is completed, the control proceeds to the step SP27.

In the step SP27 and the following steps, preparations to acquire the next captured image (a second captured image at this point) in the continuous imaging are initiated.

In the step SP27, it is judged whether or not the current diaphragm aperture at the point when the step SP27 is executed falls within the "distance measurement enabling range." In other words, it is judged whether or not the diaphragm aperture for imaging falls within the distance measurement enabling range.

When the judgment result shows that the current diaphragm aperture does not fall within the distance measurement enabling range, the control proceeds to the step SP28, where the diaphragm 35 (when described in detail, the diaphragm blades of the diaphragm 35) is driven, and the diaphragm aperture of the diaphragm 35 is changed to the full-aperture f number. That is, the diaphragm 35 is temporarily returned to the fully open state. The control then proceeds to the step SP29.

On the other hand, when the judgment result in the step SP27 shows that the current diaphragm aperture falls within the distance measurement enabling range, the control proceeds from the step SP27 directly to the step SP29 (without undergoing the step SP28).

In the step SP29, the photometry using the imaging device 5 is carried out, and the exposure parameters (specifically, shutter speed and ISO sensitivity) for acquiring the next actually captured image are determined based on the measured photometric value. At this point, the diaphragm aperture (f number) is not updated in the step SP29. That is, the diaphragm aperture determined in the step SP15 is maintained. The shutter speed for acquiring the next actually captured image is determined based on an assumption that the diaphragm aperture to be used at the time of exposure for the actually captured image in question (captured image GA2, for example) is set to be equal to the diaphragm aperture used at the time of exposure for the preceding captured image (captured image GA1, for example). Similarly, the ISO sensitivity for acquiring the next actually captured image is determined based on an assumption that the diaphragm aperture to be used at the time of exposure for the actually captured image in question (captured image GA2, for example) is set to be equal to the diaphragm aperture used at the time of exposure for the preceding captured image (captured image GA1, for example).

Further, in the step SP29, the distance measurement using the AF sensor module 20 is also carried out. In the step SP29, in particular, the distance measurement for the next captured image is carried out with the diaphragm 35 set to have the diaphragm aperture for a certain captured image (when described in detail, a diaphragm aperture within the distance measurement enabling range), and the information on the subject distance (subject distance itself or in-focus lens position, for example) is detected. Using a diaphragm aperture within the distance measurement enabling range allows the distance measurement using the AF module 20 to be carried out accurately.

After the step SP29 is completed, the control returns to the step SP21 again.

When the release button 11 is not fully pressed into the state S2 any more, the control returns to the step SP11 (FIG. 7).

On the other hand, when the release button 11 is kept fully pressed into the state S2, the control proceeds from the step SP21 to the step SP22.

The second captured image in the continuous imaging is acquired after the operations in the steps SP22 to SP26 are carried out. Specifically, in the steps SP22 and SP23, the focusing lens is driven as necessary based on the measured distance obtained in the preceding step SP29. When the judgment result in the step SP22 shows that the subject is in focus, the control proceeds to the step SP24 without undergoing the step SP23. On the other hand, when the judgment result in the step SP22 shows that the subject is not in focus, the control proceeds to the step SP23, where the focusing lens is driven to the in-focus lens position acquired in the preceding step SP29. The subject is thus brought into focus again. As a result, the subject can be brought into focus accurately again particularly when the subject distance changes.

In the step SP24, it is judged whether or not the current diaphragm aperture is equal to the diaphragm aperture for imaging. When the current diaphragm aperture is equal to the diaphragm aperture for imaging, the control proceeds directly to the step SP26. After the focusing lens is driven, the exposure for the second captured image is carried out in the step SP26. The second captured image is thus acquired.

In the step SP27 and the following steps, preparations to acquire the next captured image (a third captured image at this point) in the continuous imaging are initiated. The same operations are repeated afterwards.

As described above, when the judgment result in the step SP21 shows that the release button 11 is not fully pressed into the state S2, the diaphragm 35 is kept fully open or changed to the fully open state (steps SP18 and SP19). Specifically, when the judgment result in the step SP18 shows that the current diaphragm aperture is already the full-aperture f number, the control returns directly to the step SP11. On the other hand, when the judgment result shows that the current diaphragm aperture is not the full-aperture f number, the diaphragm 35 is driven to the fully open state (step SP19) and then the control returns to the step SP11. In this way, the AF and other operations may be carried out with the diaphragm always fully open in the live-view mode.

When the judgment result in the step SP21 shows that the release button 11 is fully pressed into the state S2, and the diaphragm aperture for imaging determined in the step SP15, which is executed immediately before the judgment, does not fall within the distance measurement enabling range (F8.0, for example), the following operations are carried out: That is, after the diaphragm 35 is temporarily set to have the diaphragm aperture for imaging in the step SP25, the exposure (step SP26) is carried out. Thereafter, the diaphragm 35 is temporarily fully opened (step SP28), and then the distance measurement and other operations (step SP29), the AF lens driving operation (step SP23), and other operations are carried out. A plurality of captured images is acquired by repeating the imaging operations described above (exposure including driving the diaphragm 35 immediately before and after the exposure).

On the other hand, when the judgment result in the step SP21 shows that the release button 11 is fully pressed into the state S2, and the diaphragm aperture for imaging determined in the step SP15, which is executed immediately before the judgment, falls within the distance measurement enabling range (F2.8, for example), the following operations are carried out: That is, the diaphragm 35 is set to have the diaphragm aperture for imaging (step SP25) immediately before the first imaging operation, and the exposure (step SP26) is carried out. Thereafter, the diaphragm 35 is not driven, but the distance measurement and other operations (step SP29), the AF lens driving operation (step SP23), and other operations are carried out. A plurality of captured images is thus acquired. A plurality of captured images is acquired by repeating the imaging operations described above (exposure without driving the diaphragm 35 immediately before and after the exposure).

Figure 9:
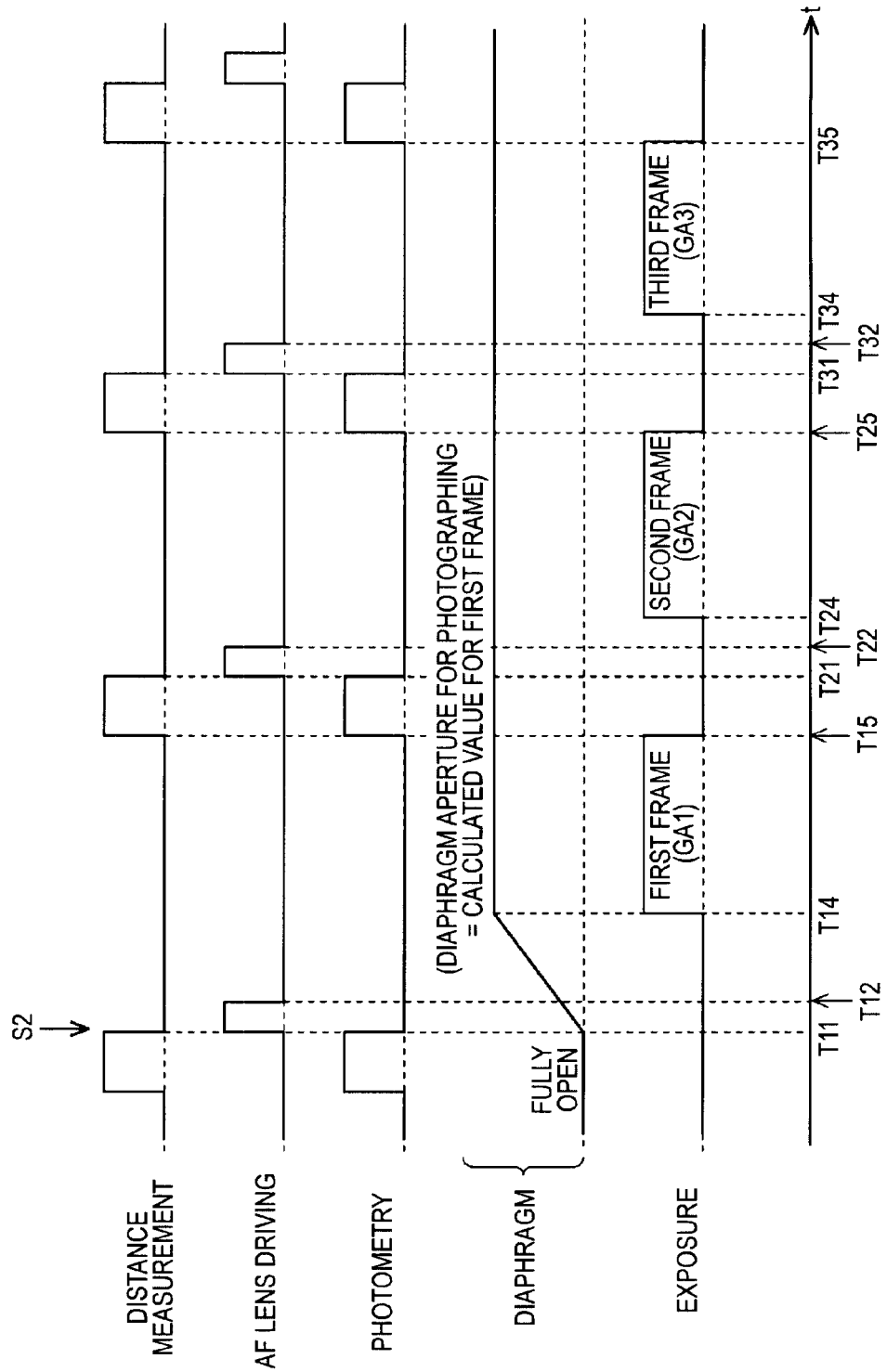
FIG. 9 is a timing chart showing the operation in the continuous imaging mode.

FIG. 9 is a timing chart showing an example of the operation in the latter one of the two continuous imaging modes described above. That is, it is assumed in FIG. 9 that the diaphragm aperture for imaging determined in the step SP15 based on the photometric value measured in the step SP13 (F2.8, for example) falls within the "distance measurement enabling range" described above (ranging from F1.4 inclusive to F4.0 inclusive, for example).

For example, assume that the release button 11 is fully pressed into the state S2 at time T11. The focusing lens is then driven (steps SP22 and SP23) during the period from time T11 to T12 based on the distance measured in the preceding step SP13. Further, the diaphragm 35 is driven from the fully open state to the state corresponding to the diaphragm aperture for imaging (F2.8, for example) (steps SP24 and SP25) during the period from time T11 to T14. The exposure for the first captured image GA1 is carried out (step SP26) during the period from time T14 to T15. The captured image GA1 is thus acquired.

Thereafter, the distance measurement and the photometry are carried out again (step SP29) during the period from time T15 to T21, and the focusing lens is driven as necessary (steps SP22 and SP23) during the period from time T21 to T22. In particular, the distance measurement using the AF module 20 is carried out from time T15 to time T21 with the diaphragm aperture within the distance measurement enabling range maintained. As a result, the distance measurement and the AF driving operation can be carried out accurately.

The exposure for the second captured image GA2 is carried out (step SP26) during the period from time T24 to T25. The captured image GA2 is thus acquired. The diaphragm aperture used at the time of exposure for the second captured image GA2 is equal to the diaphragm aperture for the first captured image Ga1. In particular, it is judged in the preceding step SP24 that the diaphragm is not driven. The diaphragm is therefore not driven during the period including the exposure for the first captured image and the exposure for the second captured image (time T14 to T25, particularly, time T15 to T24). In other words, the diaphragm 35 is not driven before the exposure for the captured image GA2 is initiated, and the diaphragm 35 maintains (keeps maintaining) the same state from the time of exposure for the first captured image to the time of exposure for the second captured image.

The operations described above allow the period from time T15 when the exposure for the first captured image is completed to time T24 when the exposure for the second captured image is initiated not to include the time frame corresponding to the period from time T11 to time T14 (50 msec, for example). Further, as will be described later, the time frame corresponding to the period necessary to return the diaphragm aperture from the full-aperture f number to the diaphragm aperture for imaging can also be eliminated, as compared with a case where the diaphragm is temporarily fully opened. The continuous imaging speed can thus be improved.

Thereafter, the distance measurement and the photometry are carried out again (step SP29) during the period from time T25 to T31, and the focusing lens is driven as necessary (steps SP22 and SP23) during the period from time T31 to T32.

The exposure for a third captured image GA3 is then carried out (step SP26) during the period from T34 to T35. The captured image GA3 is thus acquired. The diaphragm aperture used at the time of exposure for the third captured image GA3 is equal to the diaphragm apertures for the captured images GA1 and GA2. When described in detail, the diaphragm 35 is not driven before the exposure for the captured image GA3 is initiated, but the diaphragm 35 keeps maintaining the same state from the time of exposure for the first captured image to the time of exposure for the third captured image (time T14 to T35).

Thereafter, the same operations described above are repeated during the period when the release button 11 is kept fully pressed into the state S2. A plurality of captured images is thus acquired.

According to the operations described above, a plurality of captured images in the continuous imaging mode is acquired by using the same diaphragm aperture for imaging, and the diaphragm 35 is not driven but keeps the same state during the period when the plurality of captured images is acquired. For example, the first captured image GA1 and the second captured image GA2 are acquired by using the same diaphragm aperture, and the diaphragm 35 is not driven before the exposure for the captured image GA2 is initiated. Specifically, the diaphragm 35 keeps maintaining the same state at least from the time when the exposure for the first frame is initiated (time T14) to the time when the exposure for the second frame is completed (time T25). The imaging intervals in the continuous imaging can be shortened, that is, the continuous imaging speed can be further improved, because no driving operation of the diaphragm 35 accompanies imaging operation.

FIG. 18 is a timing chart showing the operation according to Comparison Example.

In Comparison Example, in response to the completion of exposure for each captured image in the continuous imaging mode, the diaphragm 35 temporarily returns from the state corresponding to the diaphragm aperture for imaging to the fully open state (time T15 to T16), and then the distance measurement and other operations are carried out (time T16 to T21). After the distance measurement and other operations are completed, the diaphragm 35 is driven again (time T21 to T24) so that the diaphragm aperture is returned to the diaphragm aperture for imaging, and then the exposure for a second captured image is carried out (time T24 to T25).

In Comparison Example described above, the period from time T15 to T16 is necessary to drive the diaphragm (50 msec, for example), and the period from time T21 to T24 is further necessary to drive the diaphragm (50 msec, for example).

In contrast, according to the first embodiment described above, the imaging intervals in continuous imaging can be shortened because the diaphragm driving period is not necessary, unlike Comparison Example. For example, the period corresponding to the diaphragm driving period from time T15 to T16 (50 msec, for example) in Comparison Example can be eliminated. Further, the period corresponding to the diaphragm driving period from time T21 to T24 (50 msec, for example) in Comparison Example can also be eliminated.

In particular, in the imaging apparatus 1 according to the present embodiment, since the semi-transparent mirror 6 is fixed in the camera body 2 and the light passing through the semi-transparent mirror 6 is used to carry out exposure for a captured image, no mirror lifting and lowering operation is carried out before and after the exposure. When the continuous imaging described above is carried out by using the imaging apparatus 1 in which no mirror lifting and lowering operation is carried out, the continuous imaging can be carried out at a significantly high speed. That is, since it is unnecessary to not only lift and lower the mirror but also drive the diaphragm in the continuous imaging period, the continuous imaging can be carried out at a significantly high speed.

In the first embodiment, when the diaphragm aperture for imaging determined in the step SP15 falls within the distance measurement enabling range, it is possible to perform the continuous imaging shown in FIG. 9 and improve the continuous imaging speed as described above. On the other hand, when the diaphragm aperture for imaging determined in the step SP15 does not fall within the distance measurement enabling range, the advantageous effect described above is not provided because the continuous imaging is carried out in the same manner in Comparison Example described above (FIG. 18). It is, however, possible in this case to set the diaphragm aperture at a more appropriate value in accordance with the brightness of a subject.

2. Second Embodiment

A second embodiment is a variation of the first embodiment. The following description will be primarily made of the difference between the first and second embodiments.

The above first embodiment has been illustrated with reference to the case where continuous imaging is carried out without driving the diaphragm on the assumption that the diaphragm aperture for imaging determined in accordance with the photometry falls within the distance measurement enabling range. On the other hand, the second embodiment is illustrated with reference to a case where continuous imaging is carried out without driving the diaphragm after the imaging apparatus 1 selects as appropriate a diaphragm aperture within the distance measurement enabling range from a plurality of diaphragm apertures and the selected diaphragm aperture is determined and set (forcibly, so to speak) as the diaphragm aperture for imaging.

Figure 10:
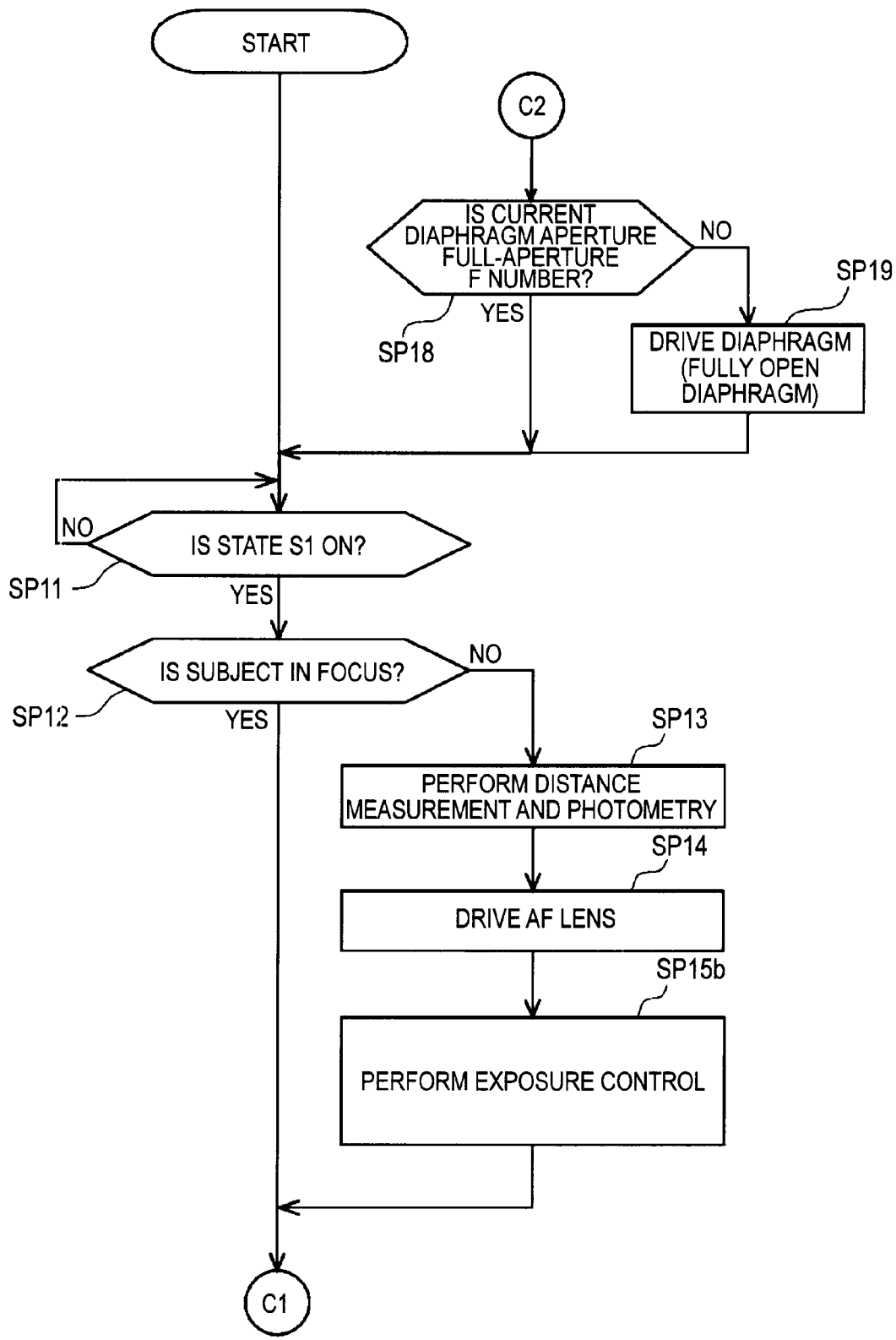
FIG. 10 is a flowchart showing the operation according to a second embodiment.
Figure 11:
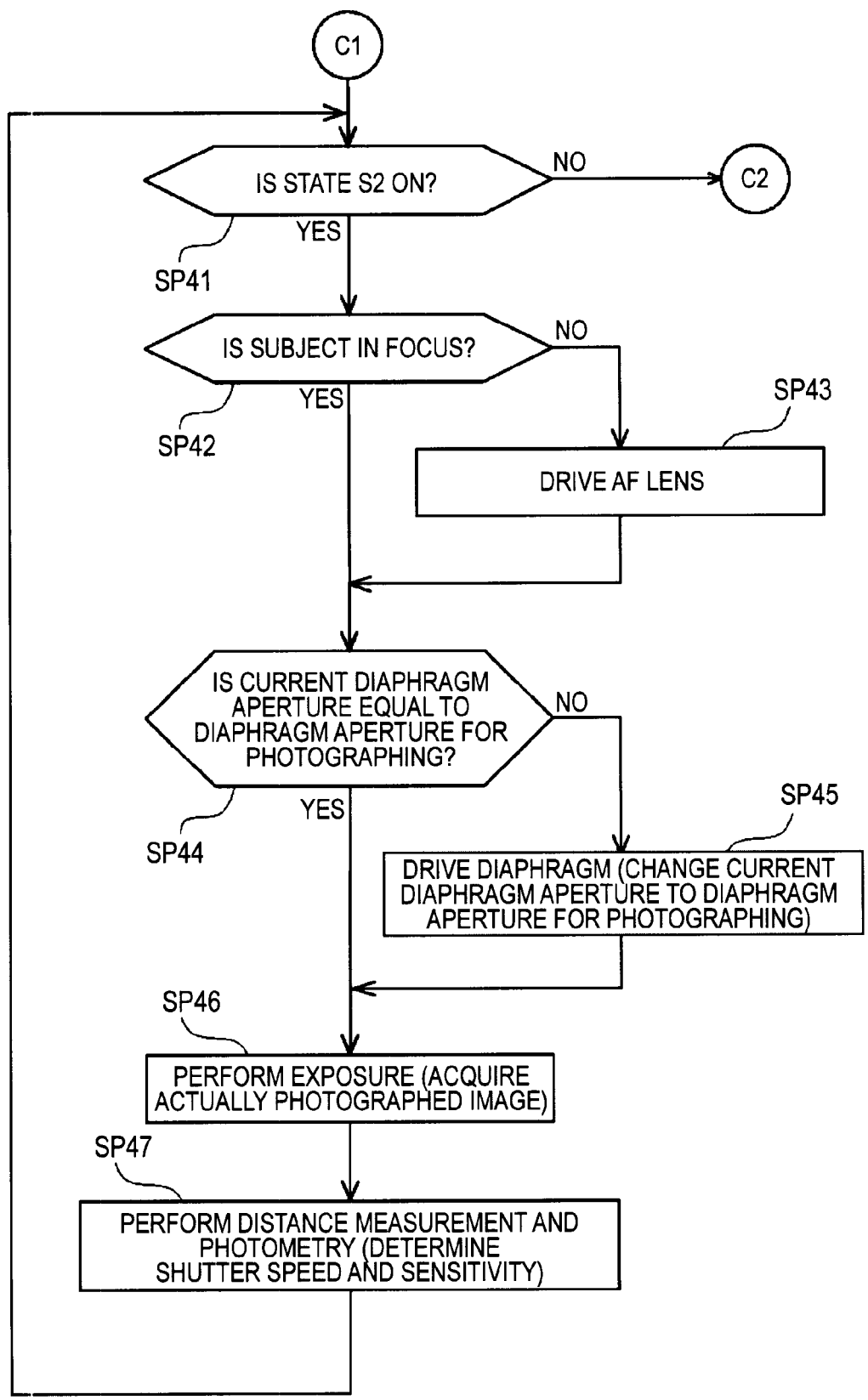
FIG. 11 is another flowchart showing the operation according to the second embodiment.

FIGS. 10 and 11 are flowcharts showing the operation in the second embodiment.

The step immediately after the apparatus is powered on to the step SP14 are the same as those in the first embodiment. In the second embodiment, however, it is assumed that the diaphragm aperture for imaging is set in advance in the continuous imaging mode at a fixed value (F4.0, for example) within the distance measurement enabling range. In other words, it is assumed that the diaphragm aperture for imaging is determined in advance at a predetermined fixed value within the distance measurement enabling range (the upper or lower limit of the distance measurement enabling range, for example) at the point when imaging preparations are initiated in the continuous imaging mode (at a point when live-view imaging is initiated, for example). That is, in the second embodiment, the "diaphragm aperture for imaging" does not depend on the photometric value measured in the step SP15 but may always be a predetermined fixed value.

The diaphragm aperture for imaging is therefore not changed in the step SP15 (SP15b) subsequent to the step SP14. Provided that the diaphragm aperture for imaging is employed as the "diaphragm aperture" among the exposure parameters for actual imaging, the other exposure parameters (specifically, "shutter speed" and "ISO sensitivity") are determined.

Further, in the second embodiment, the steps SP41 to SP47 are executed instead of the steps SP21 to SP29 in the first embodiment. In each of the steps SP41 to SP46 and SP47, the same operation as that in the corresponding one of the steps SP21 to SP26 and SP29 is carried out. In the second embodiment, since the diaphragm aperture at a point immediately after the exposure in the step SP46 (in other words, the diaphragm aperture for imaging) may always be a diaphragm aperture within the distance measurement enabling range, the operations in the steps SP27 and SP28 are not carried out.

Figure 12:
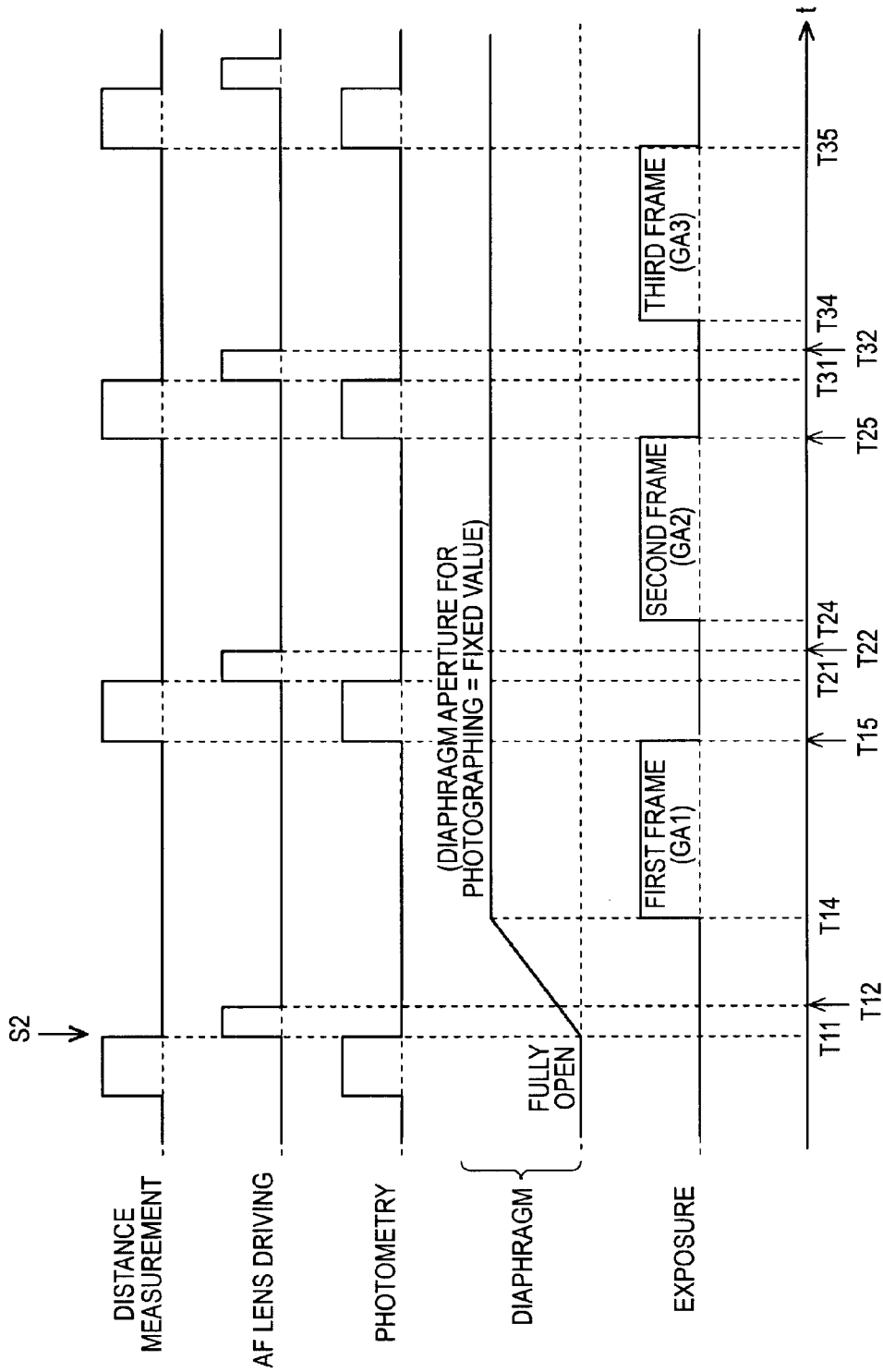
FIG. 12 is a timing chart showing the operation according to the second embodiment.

FIG. 12 is a timing chart showing the operation in the continuous imaging mode in the second embodiment. It is assumed in FIG. 12 that the AF lens driving operation in the step SF43 and the diaphragm driving operation in the step SP45 are concurrently carried out. It is further assumed in FIG. 12 that the diaphragm aperture for imaging is a predetermined value (F4.0, for example) within the "distance measurement enabling range" described above (ranging from F1.4 inclusive to F4.0 inclusive, for example).

For example, assume that the release button 11 is fully pressed into the state S2 at time T11. The focusing lens is then driven (steps SP42 and SP43) during the period from time T11 to T12 based on the distance measured in the preceding step SP13. Further, the diaphragm 35 is driven from the fully open state to the state corresponding to the diaphragm aperture for imaging (F4.0, for example) (steps SP44 and SP45) during the period from time T11 to T14. The exposure for a first captured image GA1 is then carried out (step SP46) during the period from time T14 to T15. The captured image GA1 is thus acquired.

Thereafter, the distance measurement and the photometry are carried out again (step SP47) during the period from time T15 to T21, and the focusing lens is driven as necessary (steps SP42 and SP43) during the period from time T21 to T22.

The exposure for a second captured image GA2 is then carried out (step SP46) during the period from time T24 to T25. The captured image GA2 is thus acquired.

The diaphragm aperture used at the time of exposure for the second captured image GA2 is equal to the diaphragm aperture for the first captured image GA1. It is therefore judged in the preceding step SP44 that the diaphragm is not driven. The diaphragm is therefore not driven during the period including the exposure for the first captured image and the exposure for the second captured image (time T14 to T25, particularly, time T15 to T24). In other words, the diaphragm 35 is not driven before the exposure for the captured image GA2 is initiated, and the diaphragm 35 keeps maintaining the same state from the time of exposure for the first captured image to the time of exposure for the second captured image.

Thereafter, the distance measurement and the photometry are carried out again (step SP47) during the period from time T25 to T31, and the focusing lens is driven as necessary (steps SP42 and SP43) during the period from time T31 to T32.

The exposure for a third captured image GA3 is then carried out (step SP46) during the period from time T34 to T35. The captured image GA3 is thus acquired. The diaphragm aperture used at the time of exposure for the third captured image GA3 is also equal to the diaphragm apertures for the captured images GA1 and GA2. When described in detail, the diaphragm 35 is also not driven before the exposure for the captured image GA3 is initiated, and the diaphragm 35 keeps maintaining the same state from the time of exposure for the first frame to the time of exposure for the third frame (time T14 to time T35).

Thereafter, the same operations described above are repeated during the period when the release button 11 is kept fully pressed into the state S2. A plurality of captured images is thus acquired.

According to the operations described above, a plurality of captured images in the continuous imaging mode is acquired by using the same diaphragm aperture for imaging, and the diaphragm 35 is not driven but keeps maintaining the same state during the period when the plurality of captured images is acquired. For example, the first captured image GA1 and the second captured image GA2 are acquired by using the same diaphragm aperture, and the diaphragm 35 is not driven before the exposure for the captured image GA2 is initiated. Specifically, the diaphragm 35 keeps maintaining the same state at least from the time when the exposure for the first frame is initiated (time T14) to the time when the exposure for the second frame is completed (time T25). The imaging intervals in the continuous imaging can be shortened, that is, the continuous imaging speed can be further improved, because no driving operation of the diaphragm 35 accompanies imaging operation.

In particular, according to the second embodiment, since the continuous imaging is carried out with the diaphragm aperture forcibly set at a predetermined value within the distance measurement enabling range, the continuous imaging speed can be reliably improved.

3. Third Embodiment

A third embodiment is a variation of the second embodiment. The following description will be primarily made of the difference between the second and third embodiments.

The second embodiment has been illustrated with reference to the case where the diaphragm 35 is driven to the state corresponding to a diaphragm aperture for imaging after the release button 11 is fully pressed into the state S2.

On the other hand, the third embodiment will be illustrated with reference to a case where the diaphragm 35 is driven in advance during a live-view period to the state corresponding to a diaphragm aperture for imaging and then continuous imaging is carried out. More specifically, the imaging apparatus 1 whenever necessary performs exposure control during a live-view period and changes the state of the diaphragm 35 to the state corresponding to the diaphragm aperture obtained as the result of the exposure control. The imaging apparatus 1 then continuously acquires a plurality of captured images with the diaphragm aperture immediately before the release button 11 is fully pressed into the state S2 maintained. That is, the diaphragm 35 is driven in advance to the state corresponding to the diaphragm aperture for imaging during the composition finalizing period before the release button 11 is fully pressed into the state S2, and the continuous imaging is carried out in the continuous imaging period with imaging operation accompanied by no driving operation of the diaphragm 35. In this way, the period from the point when the release button 11 is fully pressed into the state S2 to the point when the exposure for a first captured image is initiated can be further shortened.

Figure 13:
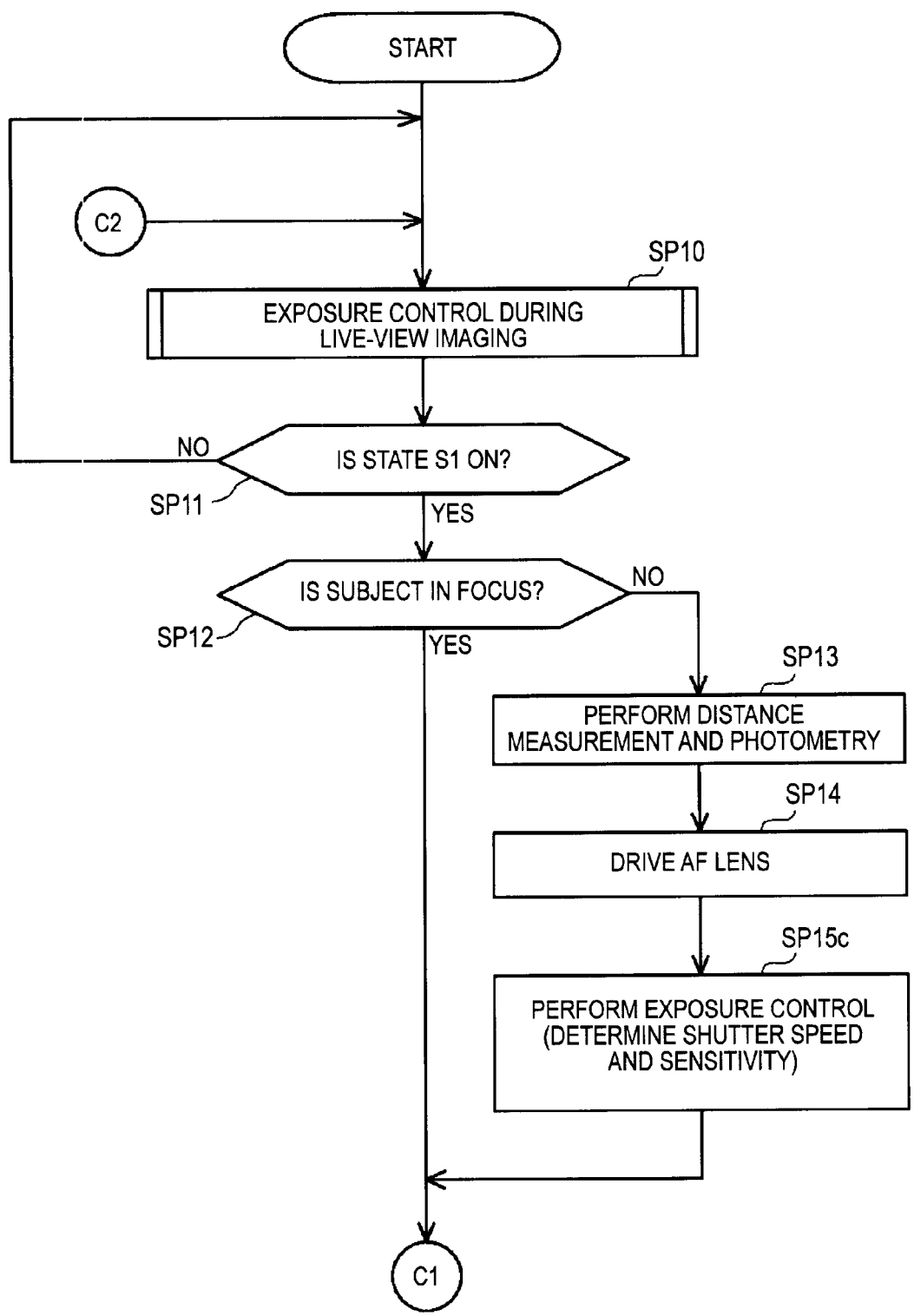
FIG. 13 is a flowchart showing the operation according to a third embodiment.
Figure 14:
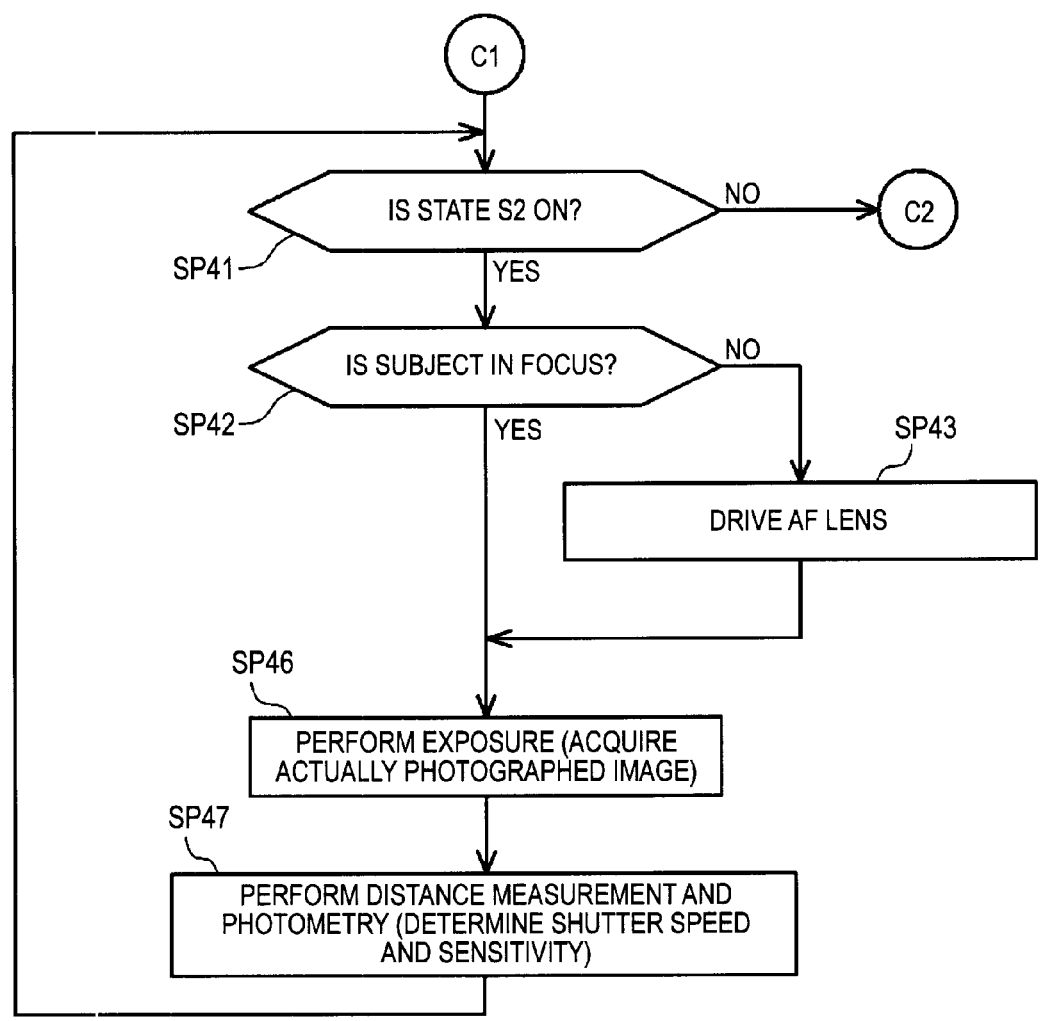
FIG. 14 is another flowchart showing the operation according to the third embodiment.
Figure 15:
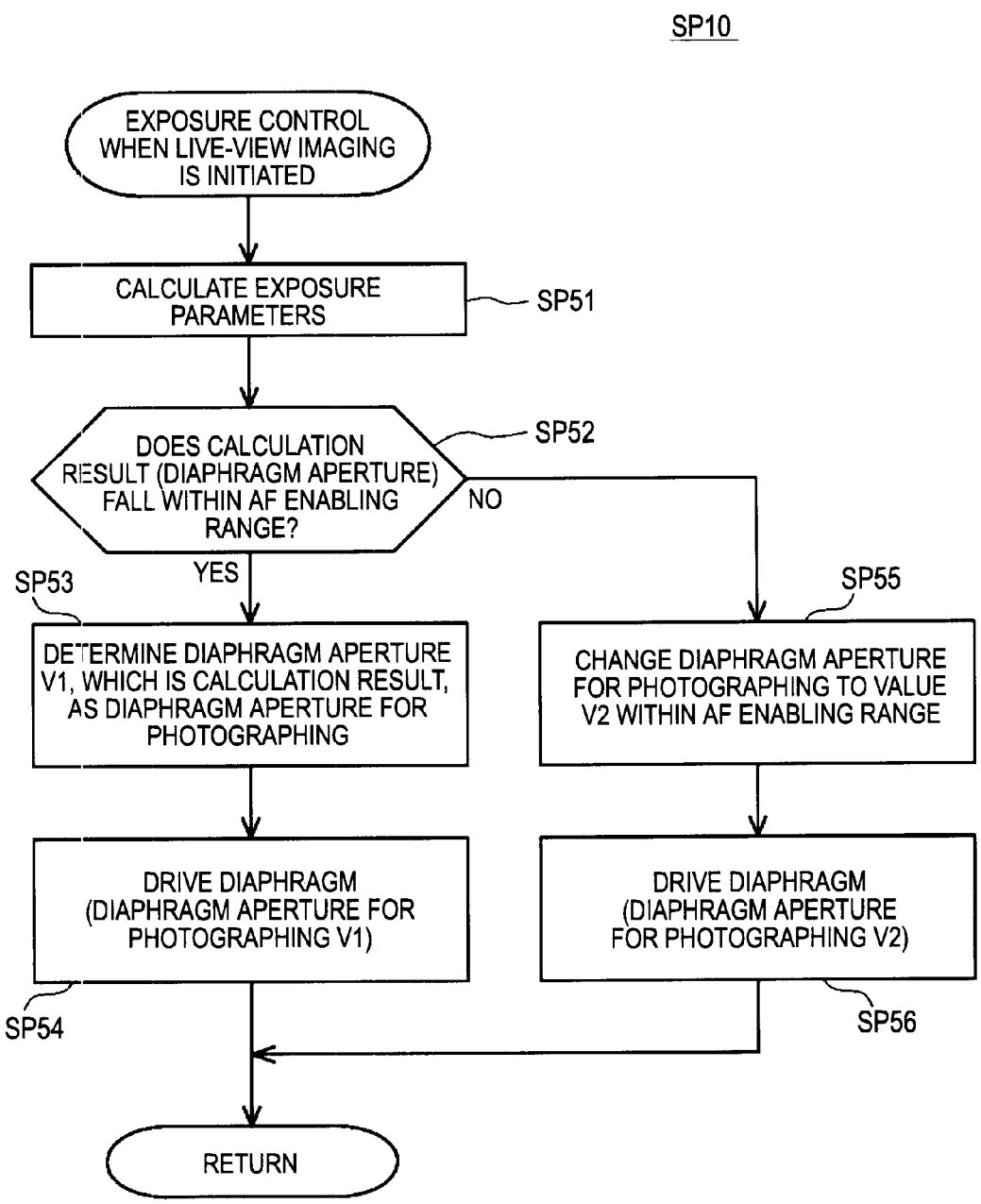
FIG. 15 is another flowchart showing the operation according to the third embodiment.

FIGS. 13 to 15 are flowcharts showing the operation in the third embodiment.

Immediately after the apparatus is powered on, the same operations as those in the second embodiment are carried out. In the continuous imaging mode according to the third embodiment, however, the diaphragm aperture for imaging is determined in an exposure control routine (step SP10) during live-view imaging, as shown in FIG. 13.

FIG. 15 is a flowchart showing the operation in the step SP10 in detail.

As shown in FIG. 15, in the step SP51, the photometry is carried out based on a live-view image acquired by the imaging device 5, and the exposure parameters are calculated in accordance with the measured photometric value. It is assumed in the step SP51 in the third embodiment, as in the step SP15 (FIG. 7) in the first embodiment, that the three types of exposure parameter (diaphragm aperture, shutter speed, ISO sensitivity) are determined by the AE controlling section 115 based on an AE program diagram.

In the step SP52, it is judged whether or not the diaphragm aperture V1 determined in the step SP51 falls within the distance measurement enabling range.

When the diaphragm aperture V1 falls within the distance measurement enabling range, the control proceeds to the step SP53, and the diaphragm aperture V1 is determined without any modification as the diaphragm aperture for imaging. For example, when the distance measurement enabling range ranges from F1.4 inclusive to F4.0 inclusive and the diaphragm aperture V1 described above is F2.8, the diaphragm aperture V1 (F2.8) is determined without any modification as the diaphragm aperture for imaging. The diaphragm 35 is driven to the state corresponding to the diaphragm aperture for imaging V1 (step SP54), and then the control proceeds to the step SP11.

On the other hand, when the diaphragm aperture V1 does not fall within the distance measurement enabling range, the control proceeds to the step SP55, and a value different from the diaphragm aperture V1, when described in more detail, a new value V2 within the distance measurement enabling range, is determined as the diaphragm aperture for imaging. It is herein assumed that the value V2 closest to the diaphragm aperture V1 but within the distance measurement enabling range is determined as the diaphragm aperture for imaging. For example, when the distance measurement enabling range ranges from F1.4 inclusive to F4.0 inclusive and the diaphragm aperture V1 described above is F8.0, the value V2 (F4.0) closest to the diaphragm aperture V1 but within the distance measurement enabling range (in other words, the maximum value within the distance measurement enabling range) is determined as the diaphragm aperture for imaging. Further, the other exposure parameters (shutter speed and ISO sensitivity) are updated in accordance with the change in the diaphragm aperture. The diaphragm 35 is driven to the state corresponding to the diaphragm aperture for imaging V2 (step SP56), and the control proceeds to the step SP11.

In the steps SP54 and SP56, it is not necessary to drive the diaphragm 35 when the current diaphragm aperture is equal to the diaphragm aperture for imaging. As a result, when the brightness of a subject does not change greatly, the frequency at which the diaphragm 35 is driven is significantly low in the step SP54 or SP56 in the step SP10, which may be executed multiple times in the live-view period.

After the step SP11, the same operations as those in the second embodiment are carried out. When the judgment result in the step SP11 shows that the release button 11 is not pressed halfway into the state S1, the control returns to the step SP10. In this regard, the third embodiment differs from the second embodiment.

Further, in the third embodiment, the diaphragm aperture for imaging is not changed in the step SP15 (SP15c), as in the second embodiment. The diaphragm aperture for imaging in the third embodiment is the value determined in the step SP10 described above. That is, during the composition finalizing period (live-view period), the diaphragm 35 is maintained to be in the state after it is driven in the step SP54 (or the step SF56), that is, the state corresponding to the diaphragm aperture V1 (or the diaphragm aperture V2). In the step SP15c, provided that the diaphragm aperture for imaging described above is employed, the other exposure parameters (specifically, "shutter speed" and "ISO sensitivity") are determined.

Further, in the third embodiment, among the steps SP41 to SP47 in the second embodiment, only the steps SP41, SP42, SP43, SP46, and SP47 are carried out. In the third embodiment, since the diaphragm 35 is driven in the step SP10 in advance, the processes in the steps SP44 and SP45 are unnecessary. When the judgment result in the step SP41 shows that the release button 11 is not fully pressed into the state S2, the control returns to the step SP10.

FIG. 16 is a timing chart showing the operation in the continuous imaging mode according to the third embodiment. It is assumed in FIG. 16 that the diaphragm aperture for imaging is set in advance at the value V1 or V2 within the "distance measurement enabling range" described above (ranging from F1.4 inclusive to F4.0 inclusive, for example).

For example, assume that the diaphragm 35 is driven to the state corresponding to a predetermined value V1 (or V2) in the step SP54 or SP56 in the exposure control in the step SP10 at a point before time T11 (several seconds before time T1, for example). Further assume that the release button 11 is fully pressed into the state S2 at the time T11.

The focusing lens is then driven (steps SP42 and SP43) during the period from time T11 to T12 based on the distance measured in the preceding step SP13. At this point, the diaphragm 35 is already in the state corresponding to the diaphragm aperture for imaging (F4.0, for example). The exposure for a first captured image GA1 is then carried out (step SP46) during the period from time T14 to T15. The captured image GA1 is thus acquired.

As compared with the second embodiment (FIG. 12), part of the diaphragm driving period (time T11 to T14) before the exposure for the first captured image GA1 is initiated, the period other than the focusing lens driving period (time T11 to T12) (that is, time T12 to T14), is unnecessary. As a result, the period from the point T11 when the release button 11 is fully pressed into the state S2 to the point T14 when the exposure for the first captured image GA1 is initiated can be further shortened.

Thereafter, the distance measurement and the photometry are carried out again (step SP47) during the period from time T15 to T21, and the focusing lens is driven as necessary (steps SP42 and SP43) during the period from time T21 to T22.

The exposure for a second captured image GA2 is then carried out (step SP46) during the period from time T24 to T25. The captured image GA2 is thus acquired.

The diaphragm aperture used at the time of exposure for the second captured image GA2 is equal to the diaphragm aperture for the first captured image GA1. It is therefore judged in the preceding step SP44 that the diaphragm is not driven. The diaphragm is therefore not driven during the period including the exposure for the first captured image and the exposure for the second captured image (time T14 to T25, particularly, time T15 to T24). In other words, the diaphragm 35 is not driven before the exposure for the captured image GA2 is initiated, and the diaphragm 35 keeps maintaining the same state from the time of exposure for the first captured image to the time of exposure for the second captured image.

Thereafter, the distance measurement and the photometry are carried out again (step SP47) during the period from time T25 to T31, and the focusing lens is driven as necessary (steps SP42 and SP43) during the period from time T31 to T32.

The exposure for a third captured image GA3 is then carried out (step SP46) during the period from time T34 to T35. The captured image GA3 is thus acquired. The diaphragm aperture used at the time of exposure for the third captured image GA3 is also equal to the diaphragm apertures for the captured images GA1 and GA2. When described in detail, the diaphragm 35 is also not driven before the exposure for the captured image GA3 is initiated, and the diaphragm 35 keeps maintaining the same state from the time of exposure for the first frame to the time of exposure for the third frame (time T14 to T35).

Thereafter, the same operations described above are repeated during the period when the release button 11 is kept fully pressed into the state S2. A plurality of captured images is thus acquired.

According to the operations described above, the same advantageous effect provided in the second embodiment can be provided.

Further, since the diaphragm 35 is changed in advance to the state corresponding to the diaphragm aperture for imaging during the live-view period, the period from the point T11 when the release button 11 is fully pressed into the state S2 to the point T14 when the exposure for the first captured image is initiated can be further shortened.

Moreover, since an appropriate diaphragm aperture V1 (or V2) according to the measured photometric value is determined in the live-view period, more appropriate exposure control can be performed. In particular, when the diaphragm aperture V1 as the result of the exposure calculation in the step SP51 falls within the distance measurement enabling range, the diaphragm aperture V1 is determined without any modification as the diaphragm aperture for imaging. As a result, more appropriate exposure control can be performed. On the other hand, when the diaphragm aperture V1 does not fall within the distance measurement enabling range, a new value V2 within the distance measurement enabling range is determined as the diaphragm aperture for imaging, and the continuous imaging is carried out with the diaphragm aperture V2 maintained. Therefore, high-speed continuous imaging can be carried out, while a relatively appropriate exposure state is maintained.

4. Variations and Others

The embodiments of the invention have been described above, but the invention is not limited thereto.

For example, each of the above embodiments has been illustrated with reference to the case where a first captured image is acquired by using a certain diaphragm aperture for imaging and second and the following captured images are acquired with the diaphragm aperture for imaging not changed but maintained, but the invention is not limited thereto. Specifically, in continuous imaging, acquisition of first to (n−1)-th captured images may be accompanied by diaphragm driving operation carried out before and after the exposure, whereas the diaphragm aperture for imaging an n-th (third, for example) captured image may not be changed but maintained to acquire (n+1)-th and the following captured images. The value n is a natural number greater than or equal to two.

Further, each of the above embodiments has been illustrated with reference to the case where the distance measurement is carried out for each captured image (captured frame) in the continuous imaging, but the invention is not limited thereto. For example, the distance measurement may not be carried out for part of the captured images in the continuous imaging. When described in more detail, the distance measurement may be carried out for every predetermined number of captured images (every three captured images, for example) in the continuous imaging. Alternatively, the distance measurement may be carried out for none of the captured images in the continuous imaging. In this case (when the distance measurement is carried out for none of the captured images in the continuous imaging), the captured images in the continuous imaging may be acquired with the diaphragm 35 set to have any diaphragm aperture that does not fall within the "distance measurement enabling range."

Similarly, each of the above embodiments has been illustrated with reference to the case where the photometry is carried out for each captured image (captured frame) in the continuous imaging, but the invention is not limited thereto. The photometry may be carried out for part or none of the captured images in the continuous imaging.

Further, each of the above embodiments has been illustrated with reference to the case where information on a single "distance measurement enabling range" is defined for each imaging lens unit 3, but the invention is not limited thereto. Alternatively, information on a plurality of "distance measurement enabling ranges" maybe defined for each imaging lens unit 3. For example, when a certain imaging lens unit 3 is a zoom lens (lens system capable of changing its focal length) and the "distance measurement enabling range" changes with the focal length, information on the "distance measurement enabling range" is preferably defined for each focal length. Similarly, when the "distance measurement enabling range" changes with the position of the focusing lens, the "distance measurement enabling range" is preferably defined for each position of the focusing lens.

Further, each of the above embodiments has been illustrated with reference to the case where the information on the "distance measurement enabling range" is stored in any one of the imaging lens unit 3 and the camera body 2, but the invention is not limited thereto. For example, the information on the "distance measurement enabling range" may be stored only in the captured lens unit 3. Alternatively, the information on the "distance measurement enabling range" may be stored only in the camera body 2.

Further, each of the above embodiments has been illustrated with reference to the case where the photometry is carried out by using a live-view image acquired by the imaging device 5, but the invention is not limited thereto. For example, a photometric device (photometric sensor) provided separately from the imaging device 5 may be used.

Further, each of the above embodiments has been illustrated with reference to the case where the light flux reflected upward off the semi-transparent mirror 6 is received by the AF module 20 disposed above the semi-transparent mirror 6, but the invention is not limited thereto. For example, the light flux reflected downward off the semi-transparent mirror 6 may be received by the AF module 20 disposed below the semi-transparent mirror 6, as shown in FIG. 17.

Further, each of the above embodiments has been illustrated with reference to the case where the spirit of the invention is applied to an imaging apparatus including the semi-transparent mirror 6 fixed in the camera body 2 (in other words, an imaging apparatus in which the mirror is not lifted or lowered), but the invention is not limited thereto. For example, the spirit of the invention may be applied to an imaging apparatus in which the mirror is lifted and lowered. When described in more detail, continuous imaging may be carried out by repeating exposure operation for an actually captured image immediately after the mirror is lifted and lowering operation of the mirror immediately after the exposure is completed with the diaphragm always maintained to have a predetermined diaphragm aperture (distance measurement enabling F number).

The present application contains subject matter related to that disclosed in Japanese Priority Patent Application JP 2009-113586 filed in the Japan Patent Office on May 8, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   continuous imaging mode setting means for setting a continuous imaging mode in which a plurality of captured images including first and second captured images are continuously acquired and each captured image is uncombined with any other captured image and recorded as a complete composed image in a main memory; and
   diaphragm control means for controlling a diaphragm in an imaging optical system,
   wherein in the continuous imaging mode, the diaphragm control means does not drive the diaphragm during a first period from the time of exposure for the first captured image to the time of exposure for the second captured image but maintains the state of the diaphragm at the time of exposure for the first captured image until the time of exposure for the second captured image.

2. The imaging apparatus according to claim 1,
   further comprising distance measurement means for detecting information on a distance to a subject,
   wherein the exposure for the first captured image and the exposure for the second captured image are carried out by using, among a plurality of diaphragm apertures, a diaphragm aperture that falls within a distance measurement enabling range, which is a range of diaphragm apertures that allow the distance measurement means to carry out distance measurement, and
   the distance measurement means detects information on the distance to the subject in the first period with the diaphragm aperture of the diaphragm set to be equal to the diaphragm aperture used at the time of exposure for the first captured image.

3. The imaging apparatus according to claim 2,
   further comprising information storage means for storing information on the distance measurement enabling range.

4. The imaging apparatus according to claim 2,
   further comprising communication means for communicating with an imaging lens unit including the imaging optical system to acquire information on the distance measurement enabling range stored in information storage means in the imaging lens unit.

5. The imaging apparatus according to claim 1,
   further comprising distance measurement means for detecting information on the distance to a subject,
   wherein the diaphragm control means selects, among a plurality of diaphragm apertures, a diaphragm aperture that falls within a distance measurement enabling range, which is a range of diaphragm apertures that allow the distance measurement means to carry out distance measurement, determines the selected diaphragm aperture as a diaphragm aperture for imaging, sets a diaphragm aperture used at the time of exposure for the first captured image to be equal to the diaphragm aperture for imaging, and sets a diaphragm aperture used at the exposure for the second captured image to be the diaphragm aperture for imaging as well without driving the diaphragm during the first period.

6. The imaging apparatus according to claim 5,
   wherein the diaphragm control means selects a predetermined value within the distance measurement enabling range and determines the selected value as the diaphragm aperture for imaging.

7. The imaging apparatus according to claim 5,
   further comprising means for accepting an imaging start instruction,
   wherein the diaphragm control means determines the diaphragm aperture for imaging in advance during a composition finalizing period before the imaging start instruction is accepted and drives the diaphragm in advance to the state corresponding to the diaphragm aperture for imaging.

8. The imaging apparatus according to claim 5,
   wherein when a first diaphragm aperture determined based on a photometric value measured during a composition finalizing period falls within the distance measurement enabling range, the diaphragm control means determines the first diaphragm aperture as the diaphragm aperture for imaging without any modification.

9. The imaging apparatus according to claim 8,
   wherein when the first diaphragm aperture does not fall within the distance measurement enabling range, the diaphragm control means selects a second diaphragm aperture that falls within the distance measurement enabling range and determines the second diaphragm aperture as the diaphragm aperture for imaging.

10. The imaging apparatus according to claim 8,
    wherein when the first diaphragm aperture does not fall within the distance measurement enabling range, the diaphragm control means selects the value closest to the first diaphragm aperture within the distance measurement enabling range and determines the selected value as the diaphragm aperture for imaging.

11. The imaging apparatus according to claim 1,
    further comprising distance measurement means for detecting information on a distance to a subject,
    wherein provided that a diaphragm aperture determined by the diaphragm control means as the diaphragm aperture used at the time of exposure for the first captured image falls within, a range that allows the distance measurement means to carry out distance measurement, the diaphragm control means does not drive the diaphragm during the first period but sets the diaphragm aperture used at the time of exposure for the second captured image to be equal to the diaphragm aperture used at the time of exposure for the first captured image.

12. The imaging apparatus according to claim 1,
    further comprising an imaging device that produces a captured image of a subject,
    distance measurement means for detecting information on a distance to the subject, and
    a semi-transparent mirror that transmits a part of components forming an optical image of the subject so that the transmitted light reaches the imaging device and reflects the remainder of the components forming the optical image so that the reflected light reaches the distance measurement means,
    wherein the imaging device acquires the plurality of captured images in the continuous imaging mode based on the optical image having passed through the semi-transparent minor.

13. An imaging lens unit comprising:
    information storage means for storing information on a distance measurement enabling range, which is a range of diaphragm apertures corresponding to the states of a diaphragm in which a light flux used in distance measurement means disposed in an imaging apparatus body to which the imaging lens unit is attached is not blocked; and communication means for transmitting the information stored in the information storage means to the imaging apparatus body.

14. An imaging apparatus comprising:

an imaging apparatus body; and an imaging lens unit, the imaging apparatus body including continuous imaging mode setting means for setting a continuous imaging mode in which a plurality of captured images including first and second captured images are continuously acquired and each captured image is uncombined with any other captured image and recorded as a complete composed image in a main memory, and diaphragm control means for controlling a diaphragm in the imaging lens unit, wherein in the continuous imaging mode, the diaphragm control means does not drive the diaphragm during a first period from the time of exposure for the first captured image to the time of exposure for the second captured image but maintains the state of the diaphragm at the time of exposure for the first captured image until the time of exposure for the second captured image.

15. An imaging apparatus comprising:

a continuous imaging mode setting unit configured to set a continuous imaging mode in which a plurality of captured images including first and second captured images are continuously acquired and each captured image is uncombined with any other captured image and recorded as a complete composed image in a main memory; and a diaphragm control unit configured to control a diaphragm in an imaging optical system, wherein in the continuous imaging mode, the diaphragm control unit does not drive the diaphragm during a first period from the time of exposure for the first captured image to the time of exposure for the second captured image but maintains the state of the diaphragm at the time of exposure for the first captured image until the time of exposure for the second captured image.

16. An imaging lens unit comprising:

an information storage unit configured to store information on a distance measurement enabling range, which is a range of diaphragm apertures corresponding to the states of a diaphragm in which a light flux used in distance measurement unit disposed in an imaging apparatus body to which the imaging lens unit is attached is not blocked; and a communication unit configured to transmit the information stored in the information storage unit to the imaging apparatus body.

17. An imaging apparatus comprising:

an imaging apparatus body; and an imaging lens unit, the imaging apparatus body including a continuous imaging mode setting unit configured to set a continuous imaging mode in which a plurality of captured images including first and second captured images are continuously acquired and each captured image is uncombined with any other captured image and recorded as a complete composed image in a main memory, and a diaphragm control unit configured to control a diaphragm in the imaging lens unit, wherein in the continuous imaging mode, the diaphragm control unit does not drive the diaphragm during a first period from the time of exposure for the first captured image to the time of exposure for the second captured image but maintains the state of the diaphragm at the time of exposure for the first captured image until the time of exposure for the second captured image.

* * * * *